US010089750B2

(12) United States Patent
Ho

(10) Patent No.: US 10,089,750 B2
(45) Date of Patent: Oct. 2, 2018

(54) METHOD AND SYSTEM OF AUTOMATIC OBJECT DIMENSION MEASUREMENT BY USING IMAGE PROCESSING

(71) Applicant: INTEL CORPORATION, Santa Clara, CA (US)

(72) Inventor: Hon Pong Ho, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 15/422,607

(22) Filed: Feb. 2, 2017

(65) Prior Publication Data
US 2018/0218513 A1 Aug. 2, 2018

(51) Int. Cl.
G06T 7/20 (2017.01)
G06T 7/593 (2017.01)
G06T 7/73 (2017.01)
G06T 7/60 (2017.01)
G06T 7/11 (2017.01)
G06T 7/174 (2017.01)
G06T 7/00 (2017.01)

(52) U.S. Cl.
CPC ............... G06T 7/596 (2017.01); G06T 7/11 (2017.01); G06T 7/174 (2017.01); G06T 7/60 (2013.01); G06T 7/73 (2017.01); G06T 7/97 (2017.01); G06T 2207/10028 (2013.01); G06T 2207/30244 (2013.01)

(58) Field of Classification Search
CPC ... G06T 7/596; G06T 7/11; G06T 7/73; G06T 7/97; G06T 7/174; G06T 7/60
See application file for complete search history.

(56) References Cited

U.S. PATENT DOCUMENTS

| 5,388,059 A * | 2/1995 | DeMenthon | G06T 7/70 702/152 |
|---|---|---|---|
| 9,424,650 B2 | 8/2016 | van Baar et al. | |
| 9,600,736 B2 | 3/2017 | Kropf et al. | |
| 2007/0122001 A1* | 5/2007 | Wang | G06K 9/00208 382/103 |
| 2010/0315412 A1 | 12/2010 | Sinha et al. | |
| 2013/0070060 A1 | 3/2013 | Chatterjee et al. | |
| 2013/0188861 A1 | 7/2013 | Rhee et al. | |
| 2013/0265392 A1* | 10/2013 | Rhee | G06F 3/005 348/46 |
| 2014/0233800 A1* | 8/2014 | Kis | G06K 9/00744 382/103 |
| 2014/0363073 A1 | 12/2014 | Shirakyan et al. | |
| 2015/0003669 A1* | 1/2015 | Solgi | G06K 9/3241 382/103 |
| 2015/0154467 A1 | 6/2015 | Feng et al. | |
| 2015/0235367 A1* | 8/2015 | Langer | G06T 7/0042 348/135 |

(Continued)

OTHER PUBLICATIONS

Besl, Paul J. et al., "A Method for Registration of 3-D Shapes", IEEE Transactions on Pattern Analysis and Machine Intelligence, vol. 14, No. 2, Feb. 1992.

(Continued)

Primary Examiner — David F Dunphy
(74) Attorney, Agent, or Firm — Green, Howard & Mughal LLP.

(57) ABSTRACT

A system, article, and method of automatic object dimension measurement by using image processing.

25 Claims, 13 Drawing Sheets

(56) References Cited

U.S. PATENT DOCUMENTS

2016/0232678 A1\* 8/2016 Kurz ................. G06F 17/30247
2017/0039731 A1   2/2017 Liu et al.
2017/0243359 A1\* 8/2017 Bose ......................... G06T 7/20
2018/0005015 A1\* 1/2018 Hou ......................... G01S 13/86

OTHER PUBLICATIONS

Borrmann, et al., "The 3D Hough Transform for Plane Detection in Point Clouds: A Review and a New Accumulator Design", 3D Res. 2, 02(2011) 3, 13 pages.
Gonzalez, et al., "Digital Image Processing", 3rd Edition, Aug. 31, 2007, pp. 652-657.
Holz, et al., "Real-Time Plane Segmentation Using RGB-D Cameras", Proceedings of 15th RoboCup International Symposium, Istanbul, 2011. In: RoboCup 2011: Robot Soccer World Cup XV, LNCS 7416, pp. 306-317, Springer 2012.
Newcombe, Richard A. et al., "KinectFusion: Real-Time Dense Surface Mapping and Tracking", Proceedings of the 2011 10th IEEE International Symposium on Mixed and Augmented Reality (ISMAR'11), pp. 127-136, Oct. 26, 2011, IEEE Computer Society, Washington DC, USA.
Ray, Harvey et al., "Ray Casting Architectures for Volume Visualization", IEEE Transactions on Transactions on Visualization & Computer Graphics, vol. 5, No. 3, Jul.-Sep. 1999.

\* cited by examiner

METHOD AND SYSTEM OF AUTOMATIC OBJECT DIMENSION MEASUREMENT BY USING IMAGE PROCESSING

BACKGROUND

Many image or light capture devices have 3D or depth sensors or cameras that can form a 3D space of a scene, measure the distance from the camera to an object in a scene, and/or provide dimensions of an object in a scene. This occurs frequently in industrial or commercial settings, such as with the measurement of boxes or containers. In these situations where such measurement of objects such as boxes occurs at high frequencies, expensive precision equipment is usually used, such as laser scanners. Such equipment, however, is not practical for the small consumer product nor affordable.

Other conventional three dimensional systems exist but are not practical for box measurement either. For example, some game consoles use a separate motion sensing panel dedicated to forming an object or scene in a three-dimensional grid and formed by using a sequence of images. The panel is typically fixed in position to reduce signal-to-noise ratio and requires an object to be moved to the field of view of the panel, which may be an inconvenience or an impossibility to the user. Also, whether or not the panel is fixed in position, the need to move or rotate the object, or to move the camera around the object to take many images of the object at different angles, also is inconvenient. Thus, such a system is no more convenient than simply measuring an object manually with a tape measure. Also, these types of panel cameras often have algorithms that cause inaccuracies including data smoothing that tends to literally and undesirably smooth corners of the image of an object resulting in the rounding of sharp edges and corners on a box being measured thereby erroneously reducing the length (corner to corner dimension) of the side on the box.

Smaller conventional depth cameras on a single device, such as a smart phone or dedicated digital camera, could be used to perform such object dimensioning. Such a conventional depth camera typically perform depth measurement by using a stereoscopic system that uses triangulation algorithms to form a depth map. Other methods to generate a depth image, such as from a single camera, also are known. These devices, however, often have sparse depth points, depth holes of missing depth data, and/or limited depth range or precision areas due to the limitations of the camera lens, sensors, and/or algorithms on such smaller, less expensive devices, often resulting in inaccurate object dimension measurements. Other significant errors can be caused by shaking the smartphone too much while holding the smart phone in the hand.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
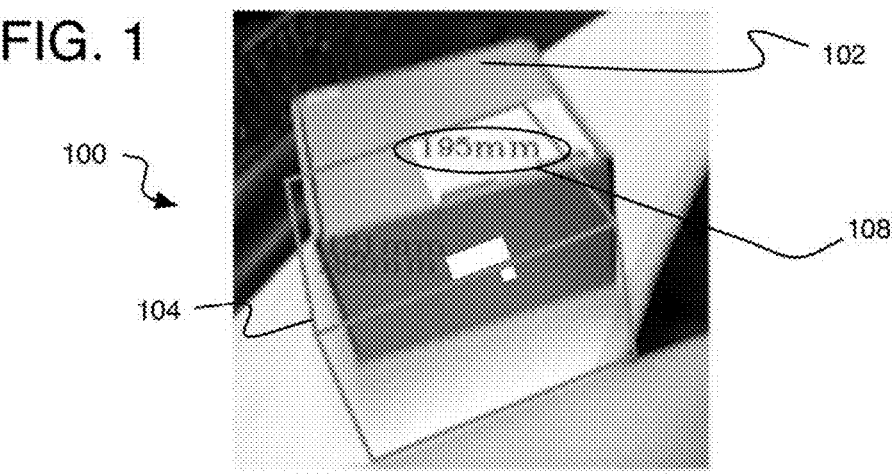
FIG. 1 is an image showing an object being measured by an imaging device and resulting in a misalignment.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and method of automatic object dimension measurement by using image processing.

As mentioned above, conventional stereo cameras or other depth measurement systems on an imaging device such as a smartphone are available that provide real-time color and depth information in a scene. Specifically, for stereo systems for example, two cameras on a device are used to capture an image of the same scene from different angles. It should be noted that the terms frame, image, and picture may be used interchangeably herein. By another example, an RGB camera and an infra-red (IR) projector are placed between two IR sensors. Triangulation then may be used to determine the depth from the cameras to an object in the scene. This may result in a depth map or depth image with (x, y, z) coordinates for each pixel. The distance between the cameras on the device can be used to determine real-world distances in the captured scene, and in turn, to measure dimensions of objects detected in the scenes.

Referring to FIG. 1, a simulation of the use of such a conventional device to perform object measurement on a single frame is shown in an image 100 where the user's hand was shaking sufficiently to form a misalignment error. Thus, an object 102, here a box, is being measured. The detected location 104 of the box is indicated by the lines forming a wireframe of the box but is in the wrong position due to the shaking or otherwise poor sensitivity of the device, and is misaligned with the actual picture of the box 102 as shown. This misalignment very likely may result in the wrong dimensions 108.

Figure 2:
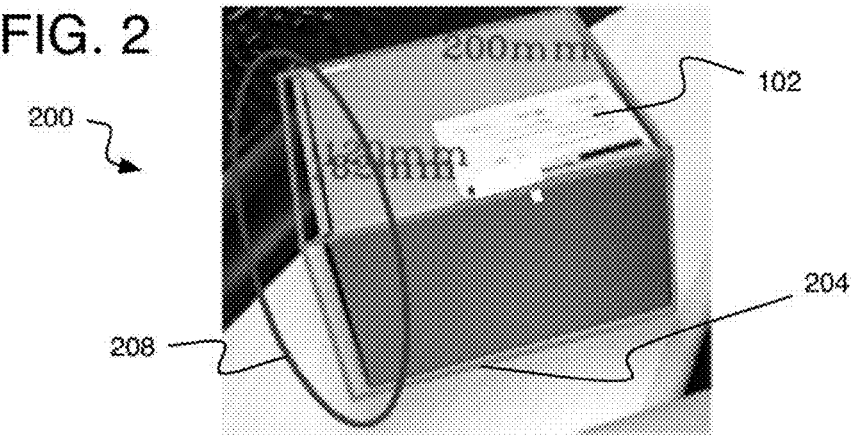
FIG. 2 is an image showing an object being measured by an imaging device and resulting in over-smoothing and a partial volume error.

Referring to FIG. 2, with a more complex and sensitive system such as a 3D motion sensing game panel, such as that provided on an xBox's Kinect® panel, this type of system is based on placement of object data in voxels grids. See, for example, Richard A. Newcombe et al., "KinectFusion: Real-time dense surface mapping and tracking", in Proceedings of the 2011 10th IEEE International Symposium on Mixed and Augmented Reality (ISMAR 2011). IEEE Computer Society, Washington, D.C., USA, 127-136. DOI=http://dx.doi org/10.1109/ISMAR.2011. 6092378. This technique, however, causes over-smoothing that are caused by averaging object surface representations (SDFs) over a number of iterations. See Id. at Session 3.3 Mapping as Surface Reconstruction. The result of averaging the SDF's of multiple 3D point clouds (or surface measurements) that are aligned into a global frame is a global surface fusion, and this results in imprecise object dimensions. A resulting image 200 shows that the smoothing algorithms used to refine the position of an object 102 within the voxel grid caused the object position wireframe 204 to be too large from partial volume effect or over-smoothing of vertices as shown by the portion of the wireframe circled at 208. The smoothing operations de-emphasized the sharp corners of the box 102 which should be preserved for accurate dimension measurement.

By other possible forms, a user may be provided a display with the object to be measured, and the user must point and click on the ends of the object being measured to form the measurement points. The labor required for this option also is not favorable compared to manual measurement, and relies too heavily on the user's hand-to-eye skills for accuracy, which may be very poor relatively speaking.

In order to resolve these issues, the present system and method uses a combination of camera tracking and box detection that preserves high sensitivity and accuracy while still being fully automatic. The disclosed system and method describe an efficient and accurate handheld system for automatic box measurement that can be used with depth cameras for example, and that overcomes or reduces shortcomings from a commodity depth camera (e.g. sparse points, depth holes, or limited depth range and/or precision), practical camera tracker errors (or drifting), and hand motion (hand shaking), while it does not require fixing of the camera position. Also, the disclosed vision-based solution, may use an optional benefit when integrated with motion sensors on a mobile platform. An end-user can scan boxes by a depth camera-equipped mobile device such that box dimensions and optionally image records can be obtained and stored efficiently.

While individual depth pixel data from RGBD cameras is not sufficiently accurate and reliable for taking high accuracy measurement and cannot overcome hand motion during multiple samplings on its own, the disclosed method uses depth camera tracking middleware to align box positions. Also, this system and method has complementary components to better ensure individual error (e.g. depth holes, tracker drift, wrong depth accumulation, other noise, etc.) can be corrected or adjusted, and will not populate down the processing pipeline.

This is accomplished by using a handheld computing device with at least one image display and that uses a world-facing depth camera, e.g. an RGBD camera such as the Intel® RealSense® R200, ZR300, or DSS, attached or integrated at the back of the handheld device. A modified camera tracking software module may be used such as that provided as part of Intel® RealSense® Software Development Kit (RSSDK) Scene Perception. Finally, the object detection pose data may be updated by using planar detection at regions-of-interest (ROIs) rather than entire images as described in detail below.

Such an arrangement may use a single camera measurement system but having multi-view advantages, a tracking drift tolerance system that overcomes occasional camera tracking errors, a live efficiency (computational load reduction) enhancement via complementary box detection feedback, and an interactive indicator of good box measurement angle.

By another form, the disclosed system and method perform a parallel planar detection operation, and by one example only on regions of interest that are likely to be the sides of an object or box in the images. The planes are scored to update existing boxes or to determine if new boxes are in the images. The box or object poses are then refined, and provided for realignment to a current frame or image with a certain camera pose. The planar detection and box refinement is performed independently of depth data accumulation and the realignment operation from frame to frame by using an exchange buffer. The parallel planar detection and refinement updates the object or box pose in an object memory, while a realignment operation retrieves whatever is the latest box pose from the object memory without waiting for the parallel planar detection operation to update the box pose in the object memory. This reduces delay, while limiting the planar search to ROIs and using the planes to refine the box poses reduces the computational load on the system so that small devices can efficiently perform the object dimension measurement. Therefore, the computer-based function of automatically measuring objects viewed in an image and by the imaging device is improved by reducing delay and computational load so that a device with a relatively smaller processing capacity and smaller memory can be used to perform accurate automatic object measurement.

In addition, a confidence value may be determined for each image with a different camera pose to provide a confidence indication to a user holding and moving the device with the camera(s). The confidence value factors the angle between the camera optical axis and the visible planes of the object or box (or normal of each plane), the distance from the camera to the object, and the object's position within the field of view of the camera. This further increases efficiency by informing the user the camera should be moved to a better position relative to the object being measured to obtain more accurate measurements. This substantially reduces the amount of images of the object from different perspectives needed to gain accurate measurements.

Figure 3:
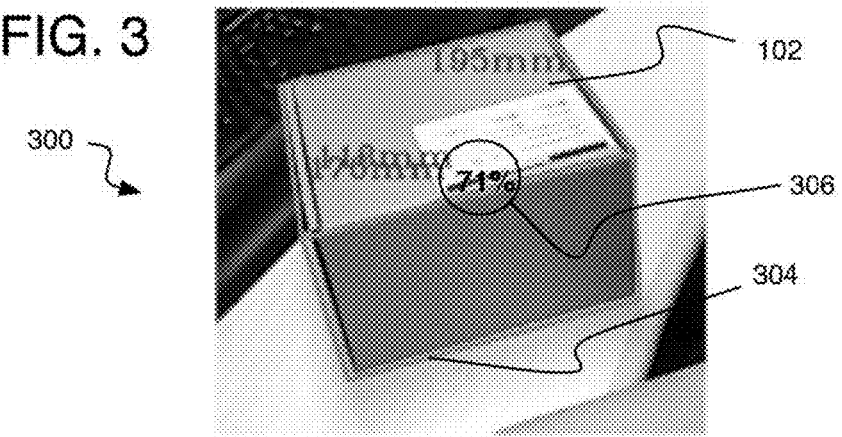
FIG. 3 is an image showing an object being measured resulting in an accurate measurement by using the method and system according to the implementations herein.
Figure 4:
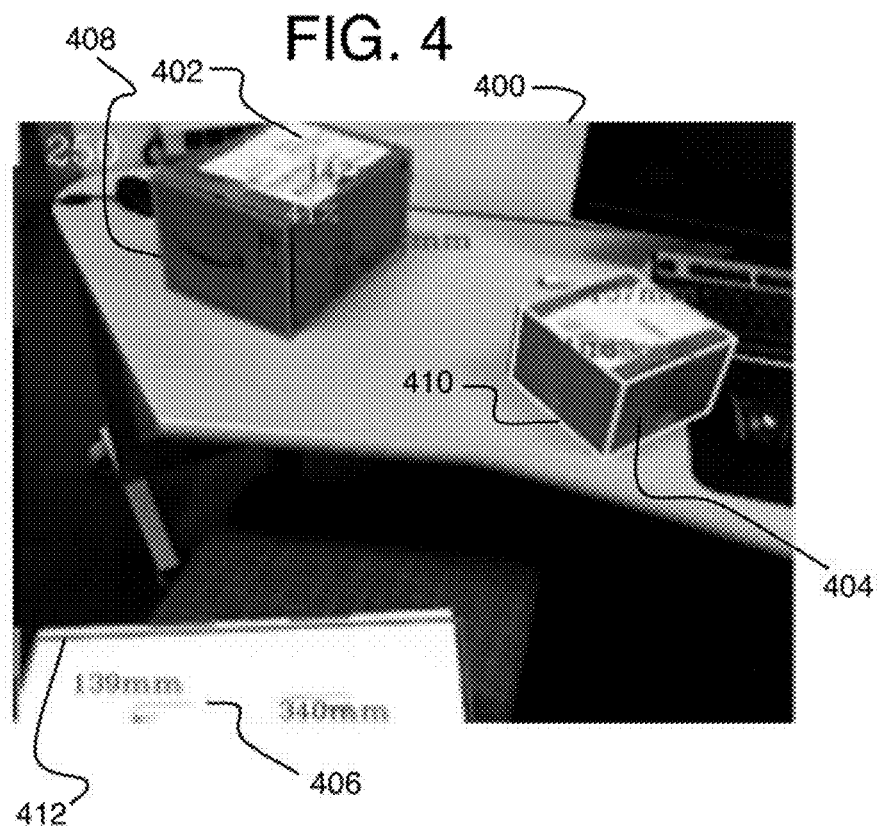
FIG. 4 is an image of multiple objects being measured according to the implementations herein.
Figure 5:
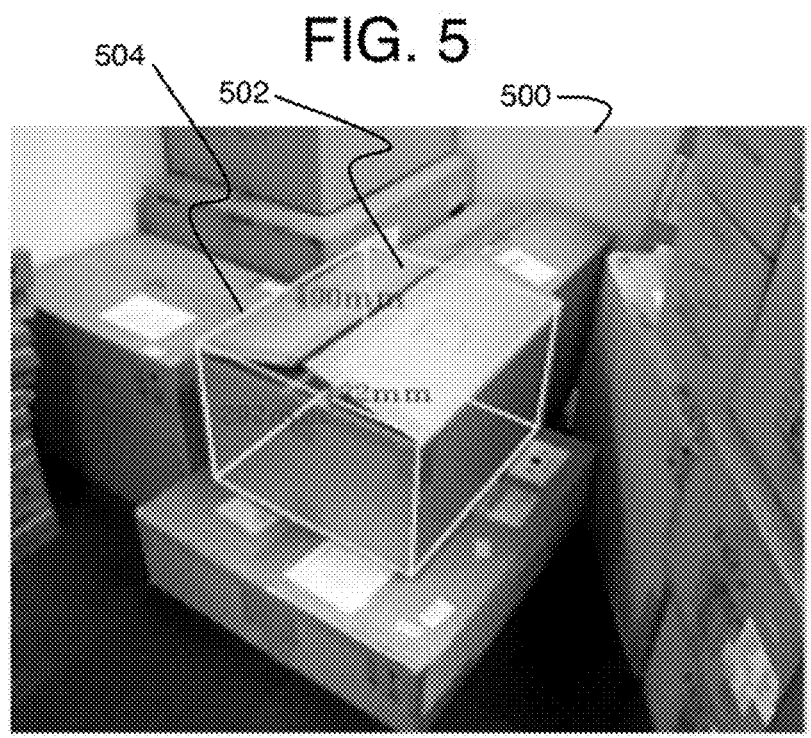
FIG. 5 is another image of an object being measured according to the implementations herein.
Figure 6:
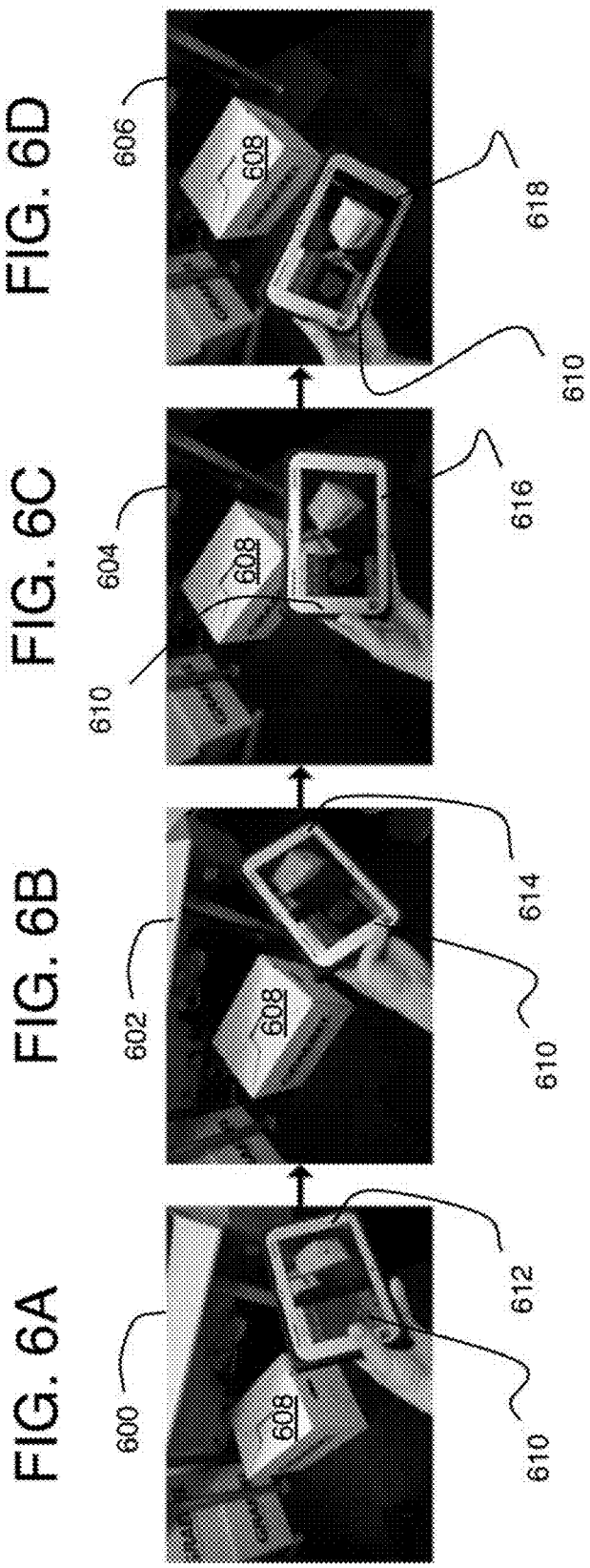
FIG. 6A is an image showing one operation for positioning an imaging device to perform the method of automatic object dimension measurement by using image processing according to the implementations herein.
FIG. 6B is another image showing one operation for positioning an imaging device to perform the method of automatic object dimension measurement by using image processing according to the implementations herein.
FIG. 6C is another image showing one operation for positioning an imaging device to perform the method of automatic object dimension measurement by using image processing according to the implementations herein.
FIG. 6D is another image showing one operation for positioning an imaging device to perform the method of automatic object dimension measurement by using image processing according to the implementations herein.

Referring to FIGS. 3-5 to provide some example results, an image 300 shows the box 102 with a wireframe 304 properly positioned to show the pose of the box 102 and generated by the implementations herein. Thus, the dimensions shown are more likely to be the correct dimensions. A confidence value 306 is shown as 71%, and is described in detail below. The user may move the camera to change the confidence value to be higher so that it is more likely that the dimensions are correct, until the confidence value says 100% if possible. Images 400 and 500 provide more examples of detected boxes 402, 404, 406, and 502 respectively with wireframes 408, 410, 412, and 504 with dimensions and confidence values also being shown. The wireframes also may be shown in different colors to indicate the size of the confidence value where for example, red may be less than 30%, yellow may be 30-80%, and green may be 80%-100%. Many other variations are possible as described below.

Referring to FIGS. 6A-6D, images 600, 602, 604, and 606 show a box 608 being measured by the use of an imaging device 610 that is moved from image to image and respectively from position 612, 614, 616, and then to position 618. As mentioned, the imaging device can be moved until the confidence value shown on the imaging device is sufficiently high or the wireframe is shown with a certain format (whether color or other formatting) that indicates a sufficiently high confidence value. The imaging device 610 may be the same or similar to that of imaging device 700. More details are provided below.

Figure 7:
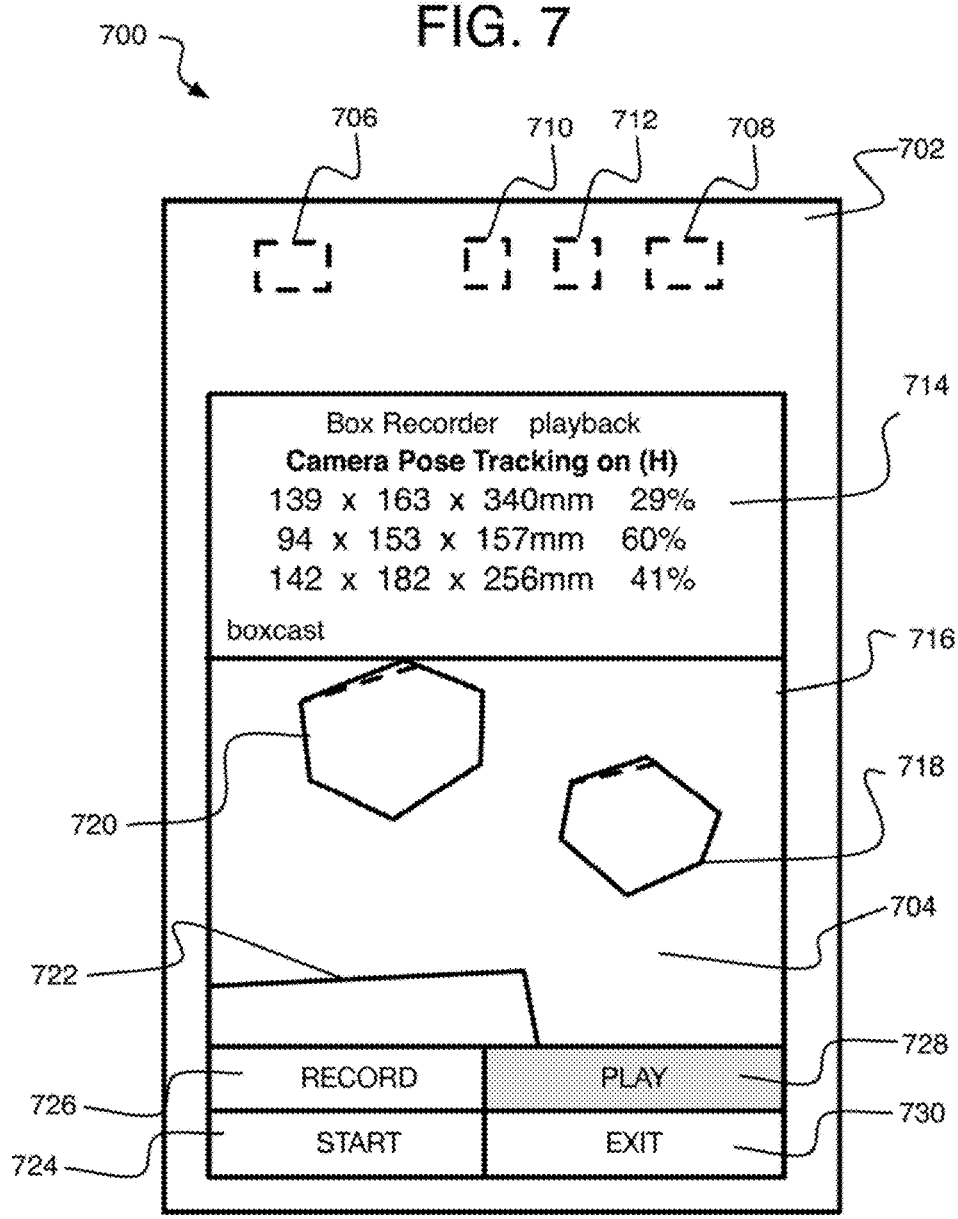
FIG. 7 is a diagram of an example user interface on an imaging device used to perform the method of automatic object dimension measurement by using image processing according to the implementations herein.

Referring to FIG. 7, an example imaging device 700 has a user interface 704 including an object or box dimension display area 714 and an image display area 716 on the user-facing side of the imaging device 700. The imaging device 700 also may have a depth camera panel that may include right and left sensors 706 and 708, an infra-red (IR) projector 710 and an RGB camera 712 and on the world-facing side of the imaging device 700. The image display area 716 shows the box arrangement as in image 400 here labeled boxes 718, 720, and 722. The dimensions of each box with a corresponding confidence value for each box is shown in the dimension display area 714. The user interface 704 also may include touch sensitive buttons such as a start button 724 to initiate the process, record button 726 and play button 728 to re-view the display during the process, and exit button 730 to end the process. This is only possible configuration for activating and deactivating the object measurement feature, and many variations of button configuration and type may be used including mechanical buttons or keyed in commands, or the clicking on other types of icons rather than the textual virtual buttons shown on device 700.

For experimental purposes, precision (H) in a process, such as Kinect fusion described below, was used on a single image without the benefit of the disclosed parallel method described herein, and (H) refers to high precision where a user (or developer) may have options to provide for high (H), medium (M), or low (L) precision. This refers to the precision of the voxel grid that will be used. As explained below, the higher the precision, the processing will generate less-rounded box corners during depth raycasting. However, when high precision is used, only small boxes can be measured due to the relatively higher computational load and the physical memory and/or GPU capacity limitations.

Otherwise, the default may be set at (M) to allow measurements of larger boxes, and the accuracy does not reduce significantly due to the other compensating parts of the process described below. (H) is used here to show that obvious differences between the input depth image (shown in dashed line) and the output box models still exist even in (H) mode when the full disclosed process is not applied. The process disclosed here does not blindly trust a raw single view input shown here especially around box edges. The present method combines measurements from different angles of camera inputs in order to obtain an accurate result.

Figure 8:
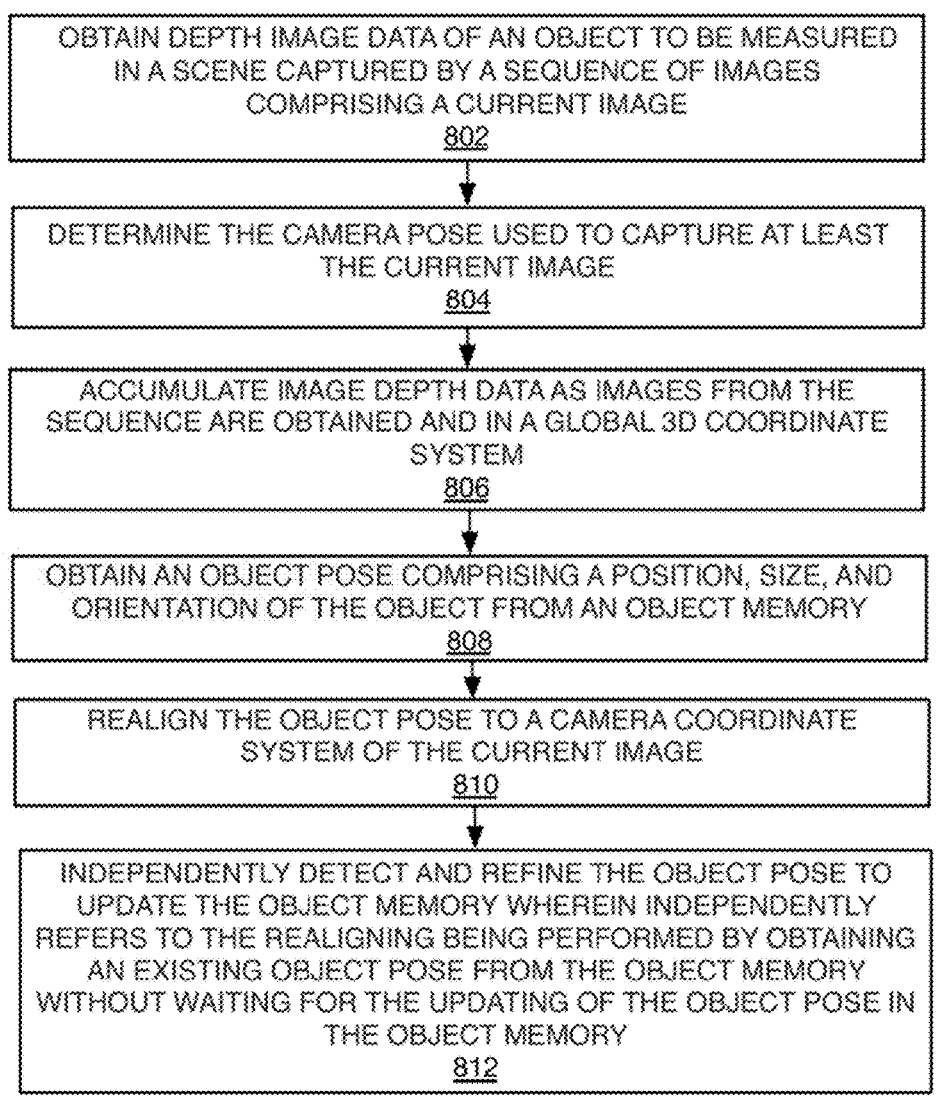
FIG. 8 is a flow chart of a method of automatic object dimension measurement by using image processing according to the implementations herein.

Referring to FIG. 8, process 800 is provided for a method of automatic object dimension measurement by using image processing. In the illustrated implementation, process 800 may include one or more operations, functions or actions 802 to 810 numbered evenly. By way of non-limiting example, process 800 may be described herein with reference to example image capture processing systems 700, 1100, and/or 1400 of FIGS. 7, 11, and 14 respectively, and where relevant.

Process 800 may include "obtaining depth image data of an object to be measured in a scene captured by a sequence of images comprising a current image" 802. This may refer to capturing images of a stationary object to be measured in a scene, and by one example, by moving a single camera around the scene and pointed toward the object. By one form, it is assumed the user will try to maintain the object to be measured as close to the center of the field of view as possible.

While the disclosed system and method are mainly discussed while being applied to boxes as the objects, such as cardboard boxes. it will be appreciated that any generally six-sided object with at least two generally planar surfaces could be used instead of a box such as cement blocks, bricks, buildings, suitcases or other carrying devices, or containers, or other devices that have at least two distinct planes that suggests a six-sided figure.

This operation also refers to capturing images with an imagining device with multiple cameras whether RGB images, IR images, or both, or other formats, sufficient to form a depth map used to generate a voxel grid of the scene being captured. This also may include whatever pre-processing is needed to generate and use the depth image data including noise filtering, image data color space format conversions, initial resolution conversions, and so forth. Also, multiple images are captured, such as with video recording, so that the object pose can be determined and refined over the multiple images. For the process 800, object dimension measurements are being generated for a current image.

Process 800 may include "determine the camera pose used to capture at least the current image" 804. As explained in greater detail below, camera pose tracking algorithms may be used to track the changes in camera pose from image to image. Generally, this may be performed by matching features in the scene, such as by point cloud matching to a voxel grid already representing the scene and object to be measured. Then, the change in camera pose from a previous image to the current image can be geometrically determined by projecting the sightlines from the newly positioned point cloud of the current image back to the camera. The camera pose may include the distance from the camera or imaging device to the objects in the scene as well as the three-dimensional direction of an optical axis of the camera or imaging device. Other details are provided below.

Process 800 may include "accumulate image depth data as images from the sequence are obtained and in a global 3D coordinate system of the current image" 806, particularly, where the 3D coordinate system may be a voxel grid of the scene, and each additional image may add more details or depth information to the voxel grid of the scene. This may be performed by updating a voxel grid that is a three dimensional representation of the scene with the data of the current image including the object being measured. The updating is performed by including a matched point cloud from the current image into the voxel grid, the voxel grid is then refined to be an accurate representation of the scene and object so far. Thus, each additional image may add areas of the scene that were not captured and included before, or may add depth data to refine areas of the scene that were already included in the voxel grid. More details are provided below.

Process 800 may include "obtain an object pose comprising a position, size, and orientation of the object from an object" 808. Here, an object memory or object buffer (also referred to as an internal box buffer when the objects are boxes or box-shaped) stores the latest object pose for a particular object, and by one example, for each object being tracked in a scene when multiple objects are present. The object pose is obtained from the object memory to be realigned to the current image.

Thus, process 800 then may include "realign the object pose to a camera coordinate system of the current image" 810. This is performed by positioning the object pose on the camera coordinate system of the current image being analyzed to give the object the proper perspective that matches the perspective in the current image. The image can then be used for display and the object(s) in the image can then be measured and dimensions can be displayed.

Process 800 may include "independently detect and refine the object pose to update the object memory wherein independently refers to the realigning being performed by obtaining an existing object pose from the object memory without waiting for the updating of the object pose in the object memory" 812. In other words, the object pose in the object memory is considered the existing or latest object pose from a history of a certain object even though the object pose may not be constructed from the data of the current image. This object pose is read or obtained for the realignment, and it is obtained whether or not the object pose in the object memory has been updated recently (such as after the analysis of the previous image).

By one form then, the object memory may be considered an object buffer, and by one example, that is part of an exchange buffer. A parallel object detecting and refining process may be used to generate the object pose or object that is placed in the object memory. Meanwhile, other data such as the camera poses of the images and the latest accumulated depth image data also may be placed in the exchange buffer when generated to be obtained for the parallel detection and refinement process. Other data needed by the detection and refinement process, such as the raw image data, also may or may not be considered a part of the exchange buffer. By one form, while data is placed in and obtained from the exchange buffer for the realignment processing on the one hand, and the object detection and refinement process on the other hand, neither operation will process data while moving data in and out of the exchange buffer. This is performed this way to minimize the waiting and/or blocking time in terms of both duration and frequency for access to a shared data buffer, and therefore maximize parallel utilization of multiple CPUs and/or processor cores system, if available. Moreover, this allows uneven read/write frequency of the two processes which contributes to flexible computation load configurations.

As explained in greater detail below, during the parallel detection and refinement process, regions-of-interests (ROIs) on a current image (or at least the image being analyzed as close to the current image as possible) are determined that are likely to render the object. This is determined from the most recent object pose in the object memory. Thus, the process must run for at least one entire initial image to generate a first object pose in the object memory. Thereafter, a plane detection operation is performed just using the pixels in the ROIs to significantly reduce the computation load. A plane detection process may be used that determines hypothetical planes in the ROIs from the accumulated depth data images, and then performs a voting process on the hypothetical planes. The result is an index of planes and the details are provided below. Then, the planes are refined and the objects are detected (or refined). This may include fitting the planes to the raw image data, rather than accumulated depth image data, and scoring pairs of planes on the likelihood the pair indicates an object plane whether an existing object or a new object. The criteria may be the planes normal directions, plane sizes, and distances to the camera. This may be repeated a number of times, for a number of images, to better ensure the existence of the object from duplicated results. Once sufficiently repeated, the object data is updated on the object memory for that object and is ready to be used for realignment. Since the realignment does not wait for updating of the object memory, and the plane and object detection and refinement may be slower than the realignment process, the object data in the object memory may be based on some number of images previous to an image being realigned. Typically, this should not be a problem when the scene and object are stationary and the motion of camera, moved by hand, should not be sufficiently fast to cause significant jumps in position of the object. More details are provided below.

Figure 9:
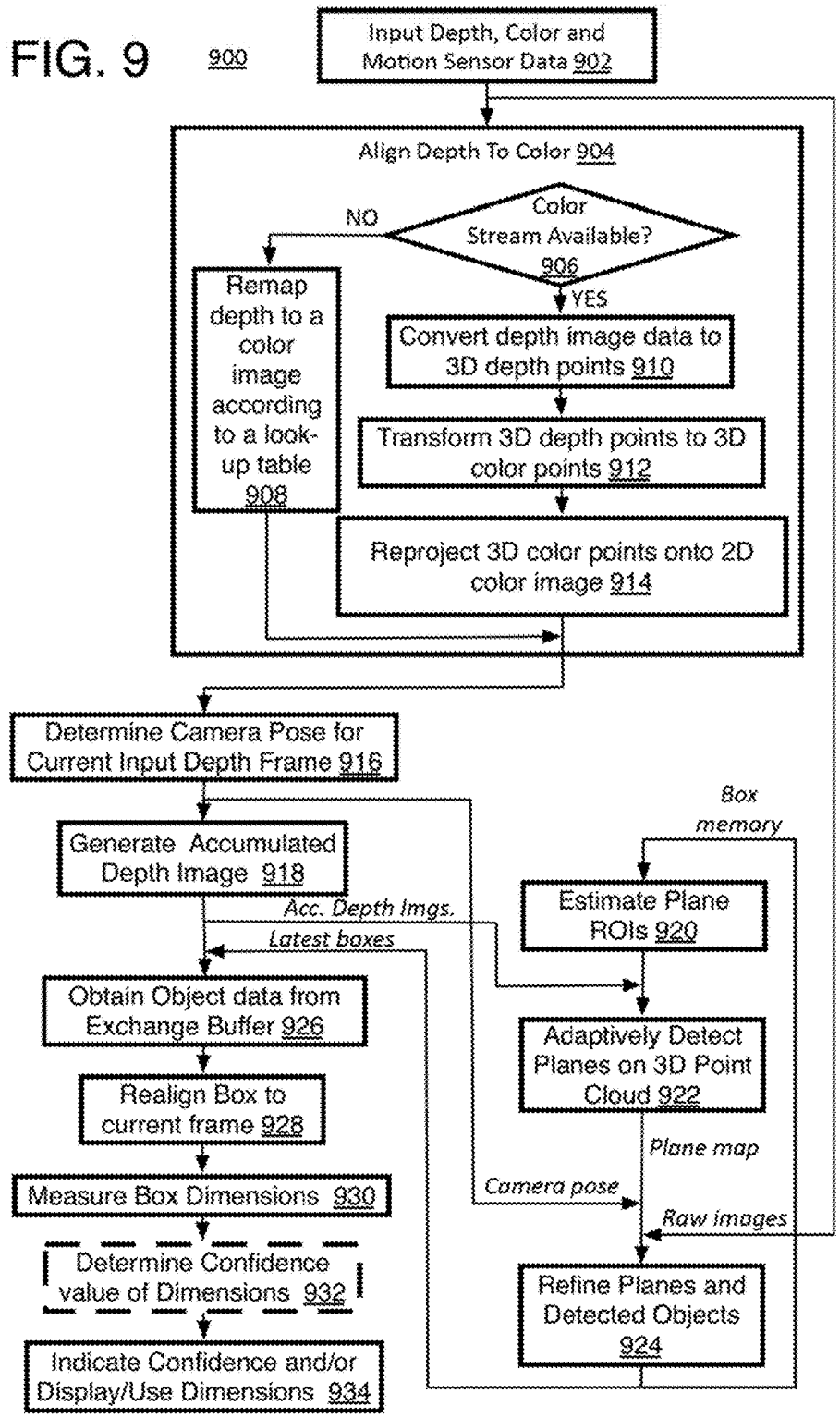
FIG. 9 is a detailed flow chart of a method of automatic object dimension measurement by using image processing according to the implementations herein.

Referring to FIG. 9, a process 900 is provided for a method of automatic object dimension measurement by using image processing. In the illustrated implementation, process 900 may include one or more operations, functions or actions 902 to 934 numbered evenly. By way of non-limiting example, process 900 may be described herein with reference to example image processing systems 700, 1100, and/or 1400 of FIGS. 7, 11, and 14 respectively, and where relevant.

Preliminarily, the following object dimension measurement operations may be initiated by the user activating the object measurement feature on a device with one or more cameras as described herein, and by a user hitting a button, switch, or some other activator, and whether a mechanical, electrical, or virtual activating device. As shown on device 700 above, this may be in the form of virtual buttons on a touch sensitive screen on an imaging device.

Otherwise, the object measurement could be activated automatically with activation of the video recording. Either way, the following processes assume that a user will attempt to position the camera so that a single object to be measured is in the center of the field-of-view (FOV) of the camera although the disclosed process has the ability to measure the dimensions of multiple objects in an image even those objects that are not centered in the field of view of the imaging device. These assumptions may be relied upon for the plane detection, object refinement, and confidence value computation operations explained below.

Process 900 may include "input depth, color, and motion sensor data" 902. As mentioned, a depth camera such as a smartphone or dedicated digital camera may be used to capture images and collect RGBD data, such as those devices already mentioned above. Minimally, the system and method should have a depth image stream and optionally a color image stream.

This operation also may include pre-processing the captured image data sufficiently to generate the depth data which may include de-mosaicing, noise reduction, pixel linearization, shading compensation, resolution reduction, vignette elimination, and so forth. Raw image data also may be stored and used for refinement of planes and object poses. The raw image data used for that operation should include at least the full resolution depth image and calibrated intrinsic and extrinsic parameters for realigning this full resolution depth image to the color image.

The depth data may be in the form of depth maps or depth images with (x, y, z) pixel coordinates for each image and that are formed from triangulation of RGB data from stereoscopic cameras by one example, or by the use of IR projector and sensors alone, or with one or more RGB cameras, to perform the triangulation. By other examples, depth measurement is performed by using methods that can be performed on a single camera rather than the use of triangulation from a stereo camera system with multiple cameras when the positions of all of the cameras relative to each other are not yet known such as when multi-cameras on a single device are not being used. Such single camera 3D or depth map computations may include time-of-flight, structural, or coded light technologies to name a few examples.

Also as mentioned above, the object may be described as a box or any six sided object, but could be any other shape with at least two planar sides that are visible or facing the camera, such as those items mentioned above. This may include furniture or other oddly shaped objects that can be generalized as having planar sides, such as two sides of a couch.

In addition, if motion sensors like gyroscope or accelerometer data are available, they can be used later for camera pose tracking as well as for determining an upright direction for plane detection as explained below.

Process 900 may include "align depth to color" 904, and when a color image stream is available, pixel depth data is first un-projected, transformed and re-projected onto the color image based on factory-calibrated camera intrinsic and extrinsic parameters. Specifically, the process 900 may include the query "color stream available?" 906, when there is an option, or otherwise simply may be set to use an expected color stream or omit the conversion to color when the color stream is not being used. In a Bayer filter system for example, chroma values may be provided in the raw image data and equations are used to compute luma values from the chroma values, such as when RGB color space is converted to YUV color space and the YUV values are used for analysis whether for the present object dimension system or other image processing systems such as for encoding or decoding. When a color stream is not available, or is not being used, and only grayscale is provided, process 900 then may include "remap depth to a color image according to a look-up table" 908. Thus, when input is provided as a 16 bits (per pixel) depth image such as with a time-of-flight camera, the images may be remapped to a 24 bits (per pixel) color image by a predefined distance-to-color look-up table. For example, red for near and/or low depth value, green for medium, and blue for far and/or high values.

When a color stream is present providing pixel color values for individual images, process 900 may include "convert depth image data to 3D depth points". 910. This is performed by applying an inverse of a camera projection matrix which has an intrinsic parameter of the depth camera where for the inverse matrix, each depth pixel (u, v) in 2D image coordinates is converted back to (x, y, z) in 3D depth camera coordinates. Such parameters may be obtained from software development kits (SDKs) such as Realsense™ SDK (RSSDK) or libRealSense.

Next, process 900 may include "transform 3D depth points to 3D color points" 912, where here, the resulting 3D depth points are transformed to the color camera coordinates to form 3D color points using rotation and translation matrices defined by calibrated extrinsic parameters. Such parameters may be obtained from software development kits (SDKs) such as Realsense™ SDK (RSSDK) or libRealSense.

Process 900 then may include "reproject transformed 3D color points onto 2D color image" 914, where here, 3D color points are projected to a color image by a camera projection matrix which contains calibrated intrinsic parameters of the color camera. Such parameters may be obtained from software development kits (SDKs) such as Realsense™ SDK (RSSDK) or libRealSense.

Next, process 900 may include "determine camera pose for current input depth frame" 916 (or current image), and "generate accumulated depth image" 918, which are integrated processes and performed by using a depth-based camera tracking module, such as that used in Scene Perception in RSSDK, which computes the camera pose for each new input depth frame using a point cloud matching operation. With an iterative closest point (ICP) algorithm with implicit surface representation, a denser and/or accumulated depth image can be generated by raycasting the internal volumetric representation of the 3D scene. See, for example, Besl, Paul J.; N. D. McKay (1992). "A Method for Registration of 3-D Shapes". IEEE Trans. on Pattern Analysis and Machine Intelligence. Los Alamitos, Calif., USA: IEEE Computer Society. 14 (2): 239-256. doi:10.1109/34.121791; for the use of voxel grids and ray casting, Foley, James D.; van Dam, Andries; Feiner, Steven K.; Hughes, John F. (1995), "Computer Graphics: Principles and Practice", Addison-Wesley, p. 701, ISBN 0-201-84840-6; and "Kinect Fusion, Kinect for Windows 1.7, 1.8", msdn.microsoft.com/en-us/library/dn1888670.aspx. Process 1000 below summarizes these operations as follows.

Figure 10:
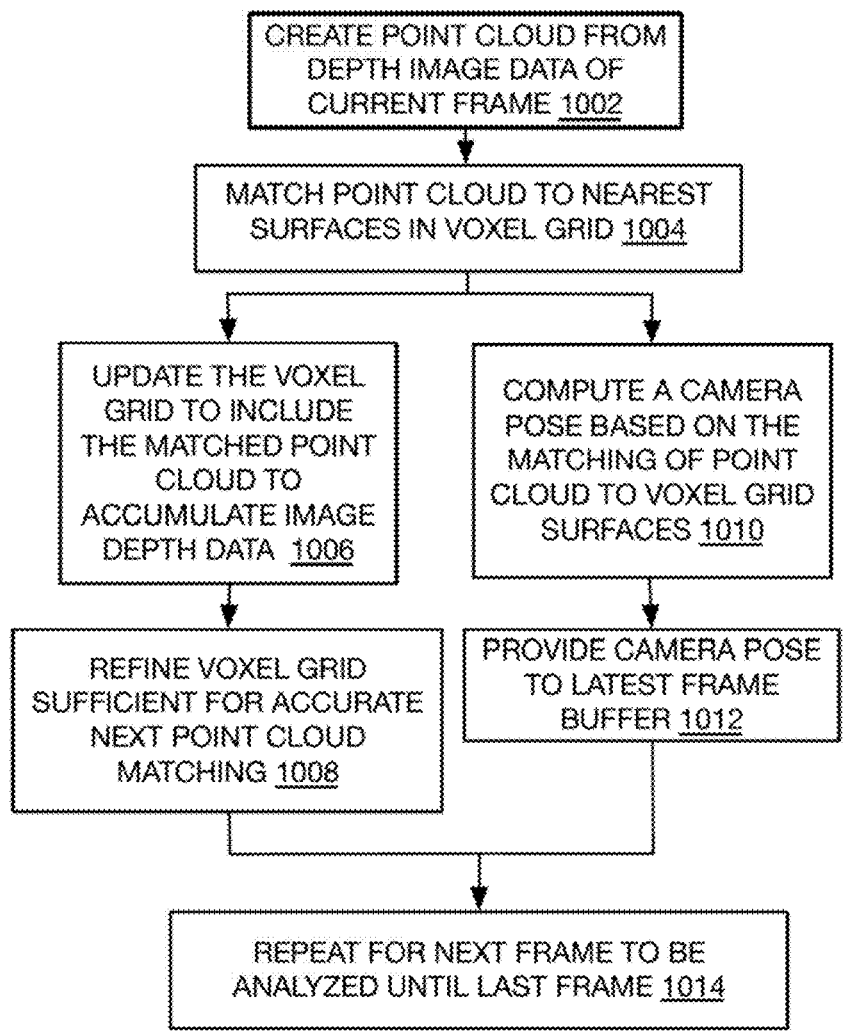
FIG. 10 is a flow chart of a method of computing a camera pose and accumulating depth data for automatic object dimension measurement by using image processing according to the implementations herein.

Referring to FIG. 10, a process 1000 is provided for a method of automatic object dimension measurement by using image processing and to explain the generation of camera poses and depth accumulation. In the illustrated implementation, process 1000 may include one or more operations, functions or actions 1002 to 1014 numbered evenly. By way of non-limiting example, process 1000 may be described herein with reference to example image processing system 700, 1100, or 1400 of FIG. 7, 11, or 14 respectively, and where relevant.

Process 1000 may include "create point cloud from depth image data of current frame" 1002. This may be generated by determining a 2D grid of sampling points with uniform spacing over the depth image, or otherwise may be determined by a fixed number of points selected randomly, or other known point selection patterns. This may be performed for each image, or particularly for each depth image, and at a minimum, each time the imaging device is moved if not performed for each depth image.

Then, process 1000 may include "match point to nearest surfaces in voxel grid" 1004. This, initially may include generating a voxel grid from the depth images so far, and may include iterative closest point algorithms that are based on means-square error thresholds for example, and that minimizes point-to-surface distances or matching errors between the voxel grid and the point cloud over a number of iterations until the error is below a certain value or a maximum iteration number is reached, such as five. Otherwise, alternative ICP algorithms could be used.

Once the proper match is determined, operations are performed that are considered to accumulate the depth images. This accumulation refers to updating the 3D global coordinates of the scene with the object being measured that is being captured by the imaging device. By the present example, the 3D global coordinates are in the form of the voxel grid. Thus, now process 1000 may include "update the voxel grid to include the matched point cloud" 1006, which may include computing and applying the registration. This may involve algorithms based on point to parametric entity distance and Iterative Closest Points disclosed by the Best article cited above.

Process 1000 may include "refine voxel grid sufficient for accurate next point cloud matching" 1008, which also may be considered the fine adjustment for the depth image accumulation. Once the voxel grid is updated as explained above, it may be refined by weighted average of individual truncated signed distance functions computed from each depth image (See the Kinect Fusion Article).

Process 1000 may include "compute camera pose based on the matching point cloud to voxel grid surfaces" 1010. Here, once the point cloud of the current image is placed on the voxel grid surface, the camera pose can be determined in the 3D global coordinates of the voxel grid by reversing the sight lines from the now inserted point cloud back to a central position where the sight lines intersect and that is the camera (or imaging device) focal point (and assumed to be the sensor location of the camera). This is determined by the registration result of the ICP matching. Also, sensor data may be used to determine the camera pose (or for camera pose tracking) where change of camera pose may be estimated from combinations of gyroscope and accelerometer readings. As mentioned, the camera pose may include the distance from the camera or imaging device to the objects in the scene, or more specifically, from the points forming the point cloud of the current depth image except now in a matching position within the voxel grid (providing the camera sensor a 3D global coordinate that includes the voxel grid) as well as the three-dimensional direction of an optical axis of the camera or imaging device.

Once the camera pose of the current image is generated, process 1000 may include "provide camera pose to latest frame buffer" 1012. Thus, the camera pose as well as the latest accumulated depth image may be placed in buffers that are considered to be part of the exchange buffer mentioned above. The camera poses may be placed in a camera pose buffer which may be, or may be in, a current frame buffer. The latest accumulated depth image also may be place in an image data buffer which may or may not be considered part of the current frame buffer and exchange buffer. Otherwise, process 1000 may include "repeat for next frame to be analyzed until last frame" 1014 which loops the process back to operation 1002 for the next frame (or image).

Figure 11:
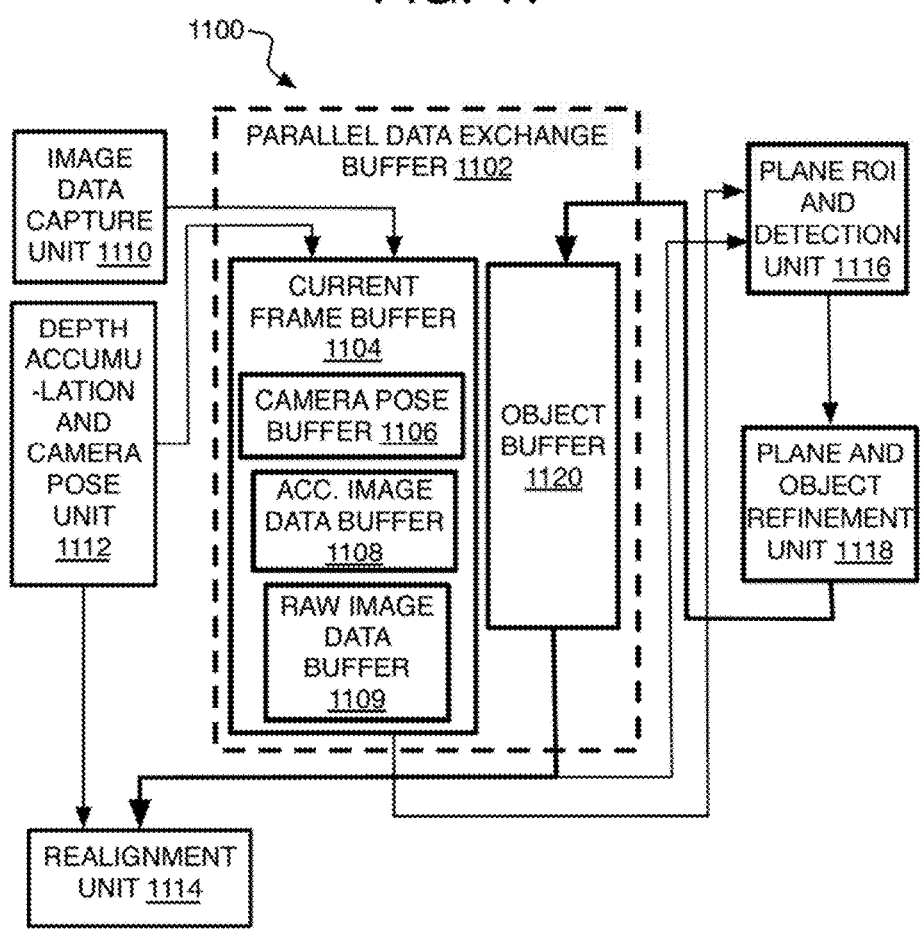
FIG. 11 is a schematic diagram of an image processing system with an exchange buffer to operate the method of automatic object dimension measurement by using image processing according to the implementations herein.

Referring to FIGS. 9 and 11, process 900 then may include "obtain object data from exchange buffer" 926. An example imaging device 1100 may be provided with an example parallel data exchange buffer 1102 (or just exchange buffer). The exchange buffer 1102 may be considered to include a current frame buffer 1104 with a camera pose buffer 1106 and an accumulated image data buffer 1108. The current frame buffer 1104 also may or may not be considered to include a raw image data buffer 1109 that receives raw images from an image data capture unit 1110. The camera pose buffer 1106 and accumulated image data buffer 1108 receives the camera pose of the current image and the latest accumulated depth image data from a depth accumulation and camera pose unit 1112 performing the relevant operations mentioned above and to be used by a parallel plane and object detection and refinement process. The exchange buffer 1102 also may have an object buffer 1120, which may be an internal object or box data buffer that receives the latest box or object pose data from the detection and refinement process and that then can be retrieved for realignment of the object to a current image (or frame) and by a realignment unit 1114. For the plane and object detection and refinement process, a plane ROI and detection unit 1116 may use the object data from the object buffer 1120 and the accumulated depth images from the accumulated image data buffer 1108. A plane and object refinement unit 1118 may use the raw image data from the raw image data buffer 1109 and the camera poses from the camera pose buffer 1108.

It will be understood that the buffers or memories forming the parallel data exchange buffer 1102 may or may not be in a single memory or single location. Each buffer may be at a different memory location and at a different type of memory. Thus, while the raw images and accumulated depth images may be held in dedicated visual processing unit or memory of GPU, the object buffer may be in a closer internal on-board buffer of a SoC for example or RAM. Many different variations are possible. The operation of the exchange buffer 1102 is explained in detail below in conjunction with process 900.

Skipping for now the explanation of the plane and object detection and refinement process, and for the realignment operation, the object pose data (or referred to as just the object) may be obtained from the object buffer so that the object can be realigned to the current image (or frame), and by one example by realignment unit 1114. This retrieval may occur for each depth image that is being analyzed and was updated to form an accumulated depth image. This may or may not correspond to each time the camera (imaging device) is moved to a new view point of the object(s) being measured. For the very first image that is being analyzed for realignment, no object data may be in the object buffer realignment yet. In this case, either the image is dropped and the next image is analyzed, or the system simply proceeds with generating object dimensions according to the conventional algorithms without retrieving a new object (or box) from the object buffer.

Thereafter, whenever realignment is to be performed, the object is obtained from the object buffer for the realignment. The system does not wait for the plane and box refinement unit 1118 to update the object data in the object buffer. Thus, the realignment may be performed by using an object that is not necessarily up to date or corresponds to the current depth image being analyzed. This may happen because the plane and object detection and refinement process uses a significantly greater amount of computations and may consume a relatively greater amount of time than the realignment process. Also, the detection and refinement process may perform a number of iterations as described below before the object pose is considered sufficiently accurate and precise to be placed into the object buffer. Since the plane and object detection and refinement process is performed to provide accurate dimensions, it does not matter that the detection and refinement processing is a little late since the actual images of the object and scene can be rendered separately and do not need to wait for the display of the dimensions.

There are varying ways to order the read and writes from the buffers. By one form, the exchange is performed when a camera pose and latest accumulated depth image is generated during the realignment process for a current image. At this time, the object is retrieved from the object buffer. On the detection and refinement side, new image data is retrieved from the image buffers, which should be the latest camera pose and accumulated depth image, as soon as the object is updated in the object buffer. By this example, no main realignment, detection, or refinement processing by the respective process, except for copying, is performed while data is being retrieved from or placed into the buffers. In other words, realignment is not being processed while the latest camera pose and accumulated depth image is being placed in the exchange buffer and the object is being retrieved from the exchange buffer. Likewise, no detection and refinement processing takes place while the camera pose and accumulated depth images, and raw image data, is being retrieved and the object pose is being updated in the object buffer with the just generated object pose.

By another approach, the retrieval of the object for realignment occurs during an exchange time window. During this exchange time window, the object is retrieved from the object buffer for realignment and the latest camera pose and accumulated depth image is placed into their respective buffers. Also during this exchange time window, the latest camera pose and accumulated depth image are obtained from their buffers for the detection and refinement process, while the next object (or object pose) is being placed into the object buffer. By this example, the two main processes (realignment on the one hand, and detection and refinement on the other hand) perform their data exchange at the same time, or at least sufficiently close to be considered at the same time considering context switching at the processor(s). Once the object is obtained from the object buffer, the realignment operation can commence.

Returning now to the parallel plane and object detection and refinement process, this process generates the object pose (or object) to be placed in the object buffer. Also, while the parallel detection and refinement process is discussed as applied to a single object, it will be understood that the process may be performed for each object to be measured in a scene, such that multiple objects are stored in the object buffer for a single image or scene (or multiple object buffers exist to provide one for each object). Thus, an object history could be tracked separately for each object when multiple object poses are stored for each object.

By one approach, estimating regions-of-interest on an image is one of the initial operations of the plane and object detection and refinement process so that the process can be applied to the ROIs rather than the entire image to substantially reduce the computational load per image. The ROIs may be based, at least in part, on the stored object pose in the object buffer from the previous analysis or updating. During the first analysis (or loop) when no object pose is stored in the object buffer yet, however, the estimation of the ROIs may be skipped and the analysis may be performed over the entire image (the entire image is the ROI).

Otherwise, once an object pose is stored in the object buffer for an object being analyzed, process 900 may include "estimate plane ROIs" 920. By one example, a binary map is generated that indicates possible locations of objects (or boxes) based on previous information of the system, such as the object pose in the object buffer that was just generated by the plane refinement and object detection. Here, the object locations can be approximated by the relatively minimal change from previous image to current image camera poses given a preset tolerance, such as a 1 cm error, which could be the result of camera tracking and/or object detection inaccuracies. Thus, the last updated object pose in the object buffer should be sufficient to predict the general object location for the current image since large object movements usually do not occur from one frame (or image) to the next frame (or image). The object pose is used to form a binary map where object pixel locations are designated with 1 and non-object locations are designed with a 0 by one example.

For usages with known features of the target object like edge color, object surface texture or background color of a measurement station, these features may be added to the ROI map as potential object or non-object regions. Feature selection is usage-specific, or may be trained to be, so that measurement of boxes at a warehouse may be tuned to recognize a certain box color such as white or brown, and so forth. Non-object outlying or background pixels are removed from object regions by setting them in the ROI binary map to 0 and "switch on" features to 1. The result here is the binary map of the image showing the regions of interest that are more likely to be planes forming a side of an object.

Process 900 may include "adaptively detect planes on 3D point cloud" 922. With the ROI map and the accumulated depth image, plane fitting may be performed on selected pixels to generate a plane index that lists plane equations and the pixels that are associated with each plane. To keep the process efficient, the accumulated depth images are first downsized to a quarter of the original depth image size (usually QVGA size). Once the plane index is refined, the plane index may be up-sampled later during the plane and object (or box) refinement described below. Once the latest depth image is downsized, the plane detection may proceed as follows using only the pixel data of the ROIs in the depth image.

By the conventional methods, detecting planar surfaces among the ROI in a 3D point cloud forming the last accumulated depth image is mostly performed with either Hough Transform or Random Sample Consensus (RANSAC) that blindly iterate through the parameter space to find the planar surfaces that fit a 3D point cloud that forms the image. Since the binary map already indicates planar regions of interest where a planar side of an object or box is more likely to occur, this may not cause a significant reduction in the frame rate. Each plane hypothesis is set by the planar equation:

$$a_h x_p b_h y_p c_h z_p d_h = 0 \qquad (1)$$

where $(x_p, y_p, z_p)$ are the coordinates in the units (such as meters) of the content (or object or feature point) in the image and for every pixel or point in the image. To perform the conventional methods, the parameters for the equation (1) $h(a_h, b_h, c_h, d_h)$ is first converted into a Polar coordinate system representation: $h(a_h, b_h, c_h, d_h) = h(\cos\theta \sin\varphi, \sin\theta \sin\varphi, \cos\varphi, d_h)$, the parameter space $(\theta, \varphi, d_h)$ is quantized, and the system effectively searches the parameter space for every possible combination of $(\theta, \varphi, d_h)$, where $\theta$ is the angle of the normal vector $(a_h, b_h, c_h)$ on the xy plane and $\varphi$ is the angle between the xy plane and the normal vector $(a_h, b_h, c_h)$ in z direction. $\theta$ ranges from 0 to 360 degrees and $\varphi$ ranges from 0 to 180 degrees. Assuming the target application operates within a 5 meter range, and hence $d_h$ ranges from 0 to 5, 5 degrees is used for both $\theta$ and $\varphi$, then 0.05 meters for $d_h$ to have reasonable plane detection results. The final plane hypotheses are those that have sufficient pixel support. A pixel $p(x_p, y_p, z_p)$ supports a plane hypothesis: $h(a_h, b_h, c_h, d_h)$ if:

$$|a_h x_p + b_h y_p + c_h z_p + d_n| <= \delta, \qquad (2)$$

where $\delta$ is a threshold to account for depth noise. Since $\{a_h, b_h, c_h, d_h\}$ are floating point numbers, in practice, the parameter space is quantized with large bin size to reduce the search time, but even with quantization, the number of hypotheses is still large. Details about the conventional Hough transform based approach can be found in R. C. Gonzalez et al., Digital Image Processing, 3rd Edition, pp. 697-700, Aug. 31, 2007.

By an alternative, a plane detection method is disclosed by U.S. patent application Ser. No. 14/819,217, filed on Aug. 5, 2015, and titled, METHOD AND SYSTEM OF PLANAR SURFACE DETECTION FOR IMAGE PROCESSING, which is incorporated herein in its entirety for all purposes. In this method, plane hypotheses are generated by directly sampling the ROI pixel data of the depth image rather than testing a range of possible values for the parameters (a, b, c, d) in the planar equation expression ax+by +cz+d for a single image point to determine the values of (a, b, c, d). Particularly, the method draws a set of hypothesis planes from the depth image by using spaced sample points among the ROI pixels on the image to form each hypothesis plane instead of being drawn blindly from the parameter space by testing a range of possible parameter values separately with every ROI pixel to form plane hypotheses.

Such a method and system also may use the gravity-sensing sensor data to further reduce the number of hypotheses when users are only interested in planar surfaces of certain orientations (e.g. planes parallel or perpendicular to the ground that indicate the top or sides of a box for example). Planes of the wrong orientation may be dropped.

Voting then may be performed to determine whether each ROI pixel belongs on a plane hypothesis and may include determining whether a particular plane hypothesis using the pixel coordinates is equal to a certain threshold, and testing to determine if the normal of the local surface near the pixel being used for voting is similar to the normal of the plane hypothesis, which at least provides better accuracy near plane boundaries. In the present example method, the system may perform voting for only those pixels that are part of the ROIs from the binary map of the frame just generated or a set of colors that known to be the target object/plane. The method and system also may include eliminating one of two or more overlapping planes, and also, using region erosion and region growth techniques that recover unfit 3D vertices (and that appear to be holes or gaps in the plane) and that occur due to depth noise. The output of the algorithm is a list of plane equations along with an index map that labels each or individual ROI pixel as belonging to a certain plane hypothesis.

Process 900 then may include "refine planes and detected objects" 924. While the plane index map is a good indication of plane locations, it may not be accurate enough for locating an object boundary. To locate precise plane locations, and in turn precise object boundaries, the raw mage data of the current image is used (and may be considered to be obtained from the exchange buffer), and the planes from the index are fit onto the raw image depth data. The raw images are provided in full depth input resolution (that is not downsized), which maintains accuracy while being sufficiently efficient for computations on a small mobile platform. The details are as follows on process 1200.

Figure 12:
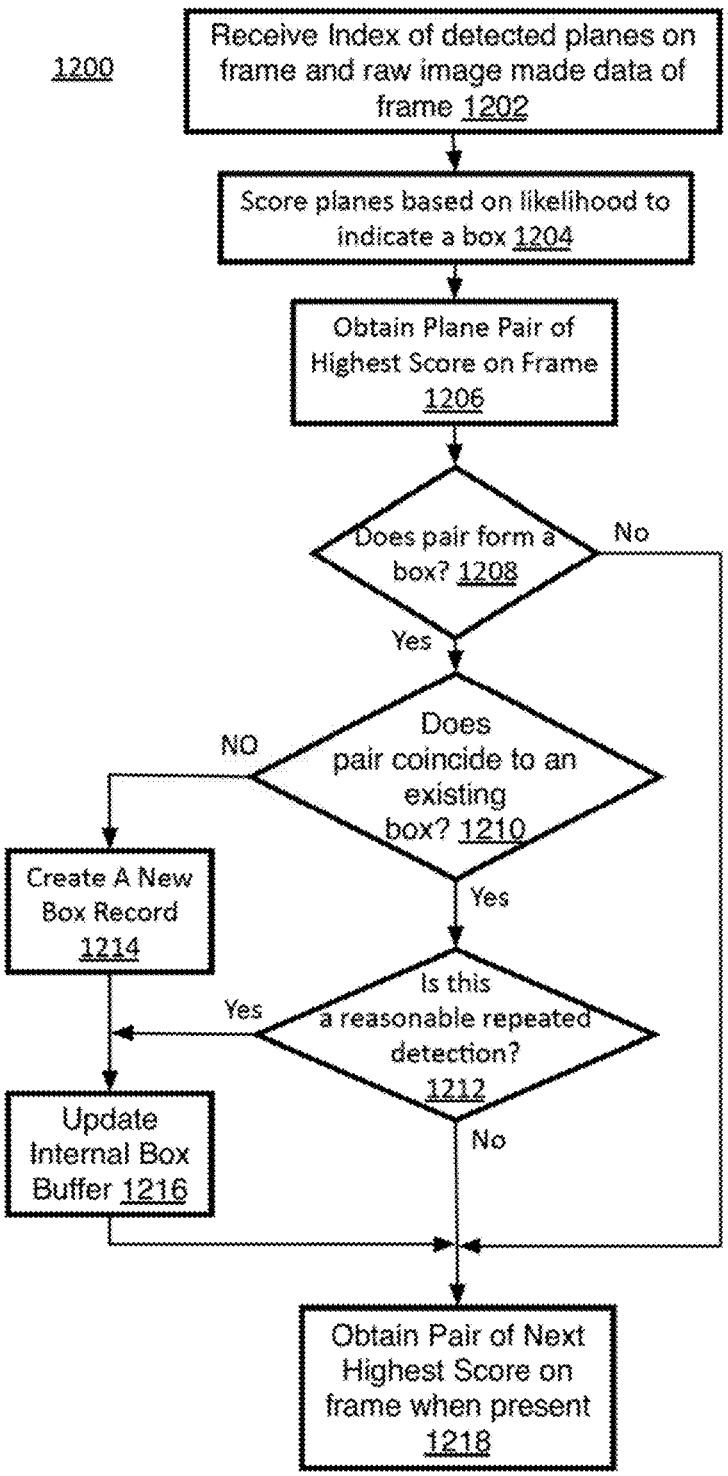
FIG. 12 is a flow chart of a method of refining planes and detected boxes for automatic object dimension measurement by using image processing according to the implementations herein.

Referring to FIG. 12, a process 1200 is provided for a method of automatic object dimension measurement by using image processing, and particularly to perform refinement of planes and detected objects. In the illustrated implementation, process 1200 may include one or more operations, functions or actions 1202 to 1218 numbered evenly. By way of non-limiting example, process 1200 may be described herein with reference to example image capture processing systems 700, 1100, and/or 1400 of FIGS. 7, 11, and 14 respectively, and where relevant.

Process 1200 may include "receive index of detected planes on frame and raw image data of frame" 1202. The index map, or just index, may be up-sampled to full resolution to match the resolution of the raw current image.

Process 1200 may include "score planes based on likelihood to indicate a box" 1204. This initially includes fitting the planes of the index onto the ROIs on the raw image data. The result is a new index that assigns more pixels added from the raw image data and to the planes on the index and including only those pixels within the ROIs, thereby increasing the accuracy of each plane.

The planes are then each scored to determine whether the plane indicates the side of an object such as a box. The scoring algorithm may factor the plane size and the plane position relative to the center of the image. These factors are used because it is assumed that a user will attempt to center the camera field of view (FOV) on the object to be measured and this should result in the planes forming the object being the largest planes in the image. The resulting score will increase with a larger plane and more central position. Larger planes tend to give better plane normal estimation from depth data and hence better box boundary given by intersection of two planes.

Process 1200 may include "obtain planar pair of highest score on frame" 1206. All possible plane pairs are then listed and in order of their total score for the pair. The pair of planes with the highest score is assumed to indicate different sides of the same object to be measured in the image.

Process 1200 then may include the query "does pair form a box?" 1208 (or form an object). This is determined by comparing the normal directions of the two planes to determine whether the planes are on opposite sides of a six sided object or at right angles from each other. Another factor that is checked is the plane boundaries to determine if the two planes have a length or width that is substantially intersect, or at least 90% of the whole intersecting length. When the length along that intersection is the same for each plane, it is a strong indicator that an object or box is formed by the planes. Furthermore, the plane boundaries should be parallel in 3D space. The pair of planes that satisfies each of the factors here is then considered a potential pair.].

Process 1200 then may include the query "does pair coincide to an existing box" 1210. For this operation, a record or history of each detected object or box is maintained in a library, and the two planes are compared to each detection through the history of the object from image to image and for a substantial match, such as within 1 cm. By another form, only the latest image or detection is compared to the planes. The library may be stored separate from the object buffer.

The potential pair is checked against all previous detected boxes for repeated detection for the object in the current image. If the plane pair coincides to a known box, process 1200 may include the query "is this a reasonable repeated detection?" 1212. The detection is considered a reasonable repetition if the three box axes are matched within a small tolerance, such as about 3 degrees of error, and at least two box corners are matched in the global 3D space within a small distances, such as 1 cm.

If the detection is considered reasonable, the planes are considered to form the object pose. The process may then loop back to the ROI operation 920 if it is determined that this same object pose has not been generated a sufficient number of iterations yet to be sufficiently reliable to place it in the object buffer for use (such as five times by one possible example). Boxes formed from partial planes that touch an image boundary are marked incomplete and not used in reliability counting.

If a sufficient number of iterations did result in the substantially same plane pair and in turn object pose, then the corresponding box history is updated, and the process 1200 may include "update internal box memory" 1216 (or in other words, the object buffer). By one approach, median values of the plane are output as the box dimensions for the object pose, and over the current and previous detections subject to a limit of history duration. In other words, the median value will only include previous values from a certain number of previous images.

Alternatively, if an unreasonable box location is found, the detection is discarded.

When the highest scoring plane pair does not coincide to an existing box, process 1200 may include "create a new box record" 1214, and then process 1200 may include "update internal box memory" 1216, or object buffer as before with the existing object. It is important to note that all newly detected objects or boxes are transformed to a global coordinate system based on the camera pose associated with their input depth images before being placed in the object buffer.

Once the object buffer is updated or an unreasonable detection is established, process 1200 may include "move to pair of next highest score on frame when present" 1218, so that the process is repeated for each pair found on the image so that each potential object on the image is considered. The parallel plane and object detection and refinement process repeats as long as the user has the object dimension feature activated and is capturing the images of the scene with one or more of the objects. The process will continue operating even when the camera is not being moved, but it could be set to freeze or stop when the camera stops moving.

The resulting retrieved object, or object pose, may include 3D global coordinates of the pixels forming the object thereby including or indicating the distance from the camera as well as the size and orientation of the object. The object pose may include the coordinates of the box corners in sub-pixel accuracy as well.

Process 900 then may perform "realign object to current frame" 928. While box detection and refinement is run in parallel, each input frame with a camera pose is also re-matched with the last box memory such that the latest box data is returned to the host application without delay. The re-matching is achieved by retrieving objects or boxes that are in the memory buffer 3D coordinate system defined as a global reference, and then realigning the object poses to the latest camera pose P in the camera coordinate system and of the current image. This may be performed by multiplying each 3D point by P where P is a coordinate transfer value or function of the camera pose.

Process 900 may include "measure box dimensions" 930, where once the coordinates of the object are determined for the current image, the dimensions may be computed simply from the coordinates of the box corners in the global reference coordinate system.

Optionally, process 900 may include "determine confidence value of dimensions" 930. This refers to a feature where a confidence indication of the computed dimensions of the object is displayed to the user on the screen of the device or camera so that when the confidence is relatively low, the user will understand that the camera should be moved to a different perspective or view of the object to attempt to increase the confidence in the dimensions, and in turn the reliability of the dimensions. The confidence value may always be provided or may be a user selected option.

One example confidence value may be defined as:

$$b_{score} = \alpha\left(\max_i\left(1 - N_i \cdot \frac{P_i - C}{\|P_i - C\|}\right)\right) + \beta\left(1 - \frac{\|B - C\| - d}{d}\right) \quad (3)$$

$$b_{conf} = \left(1 - \cos^{-1}\left(\left|\frac{B}{\|B\|}\right|_2\right)\right) b_{score} \quad (4)$$

where
C=camera position$\in \mathfrak{R}^3$
B=box center$\in \mathfrak{R}^3$
$N_i$=normal direction of visible plane i$\in\{1, 2, 3\}$
$P_i$=center$\in \mathfrak{R}^3$ of box plane i$\in\{1, 2, 3\}$
d=best camera to box distance (prior)
$\alpha$=0.9, $\beta$=0.1 and where $b_{score}$ is a confidence score determined in equation (3) that is then modified in equation (4) to obtain a confidence value $b_{conf}$. Box or visible planes i are each a plane or side of the box or object, camera position C is the three-dimensional coordinate position, B box center or object center also provided in three-dimensional coordinates and is determined by averaging the coordinates of the six box corners in 3D, the visible plane and box plane are the same thing and refer to one of the three i planes that are visible to the camera and of a solid (non-transparent) six-sided object or box by one example. The center of the box plane is considered to be the average coordinates of the four plane corners in 3D. The best camera to box distance d is a constant value and is the distance that should be used for good results. The constant d depends on the camera type and may be determined by experimentation. If the box is too close to the camera, some depth data of the box may be missed due to the shape of the camera field-of-view (FOV). On the other hand, if the box is too far from the camera, the depth quality and/or accuracy decreases due to camera range limits. One example distance d for an RGBD camera is about 750 mm. This is a distance where the camera provides good depth data for a complete box within the FOV.

The confidence value may be based on the plane angle facing the camera (component 1), the distance between the object and the camera (component 2), and the distance of the object from the center of the field of view (component 3). The plane angle confidence is greatest when the camera is at about a 45 angle to the planes to provide a sufficiently large angle to provide many differences in depth along the plane for many comparisons while also an angle that is sufficiently small to provide a large number of points on the plane. The distance of the object to the camera has the same advantages and disadvantages as mentioned above for plane and object refinement, and the field of view position better ensures that the object is not being cut off by the edges of the field of view resulting in missing potential data of the object. The Coefficient $\alpha$ is multiplied by component 1, coefficient $\beta$ is multiplied by component 2 to obtain the confidence score $b_{score}$. The confidence score $b_{score}$ is then multiplied by the component 3 to compute the confidence value $b_{conf}$. Coefficients $\alpha$ and $\beta$ are determined by experimentation and must add up to 1. It will be appreciated that the confidence value could be based on one of these factors, a different combination of these factors, or more factors. One alternative factor includes average, median, and/or maximum point-to-plane errors between input raw depth data and box plane data re-projected from detected 3D box corners. A perfect detection from a noiseless depth image shall have zero error; thus, such a measure also reflects reliability of the detection.

The resulting confidence value $b_{conf}$ may be a probability from 0 to 1, which is easily converted to a percentage up to 100% to format the probability for display when desired, or is otherwise indicated on a display as described below. Other details of the confidence display process is provided by process 1300 below.

Process 900 may include "display confidence value indication and dimensions" 932. The dimensions may be displayed as a separate listing as shown on device 700 above (FIG. 7) or may be shown along the length or width that is being measured as in image 300 (FIG. 3). The confidence value may be a number, such as a percentage of 100% confident, that is either displayed at each dimension listing as with device 700 or displayed over the object also as shown on image 300 above. Otherwise, the color of a wireframe indicating the pose of the object or box may indicate the confidence value such as with red, yellow, and green described below. An audio emission may be made as well reciting the dimensions of the object(s). Many variations are possible.

Figure 13:
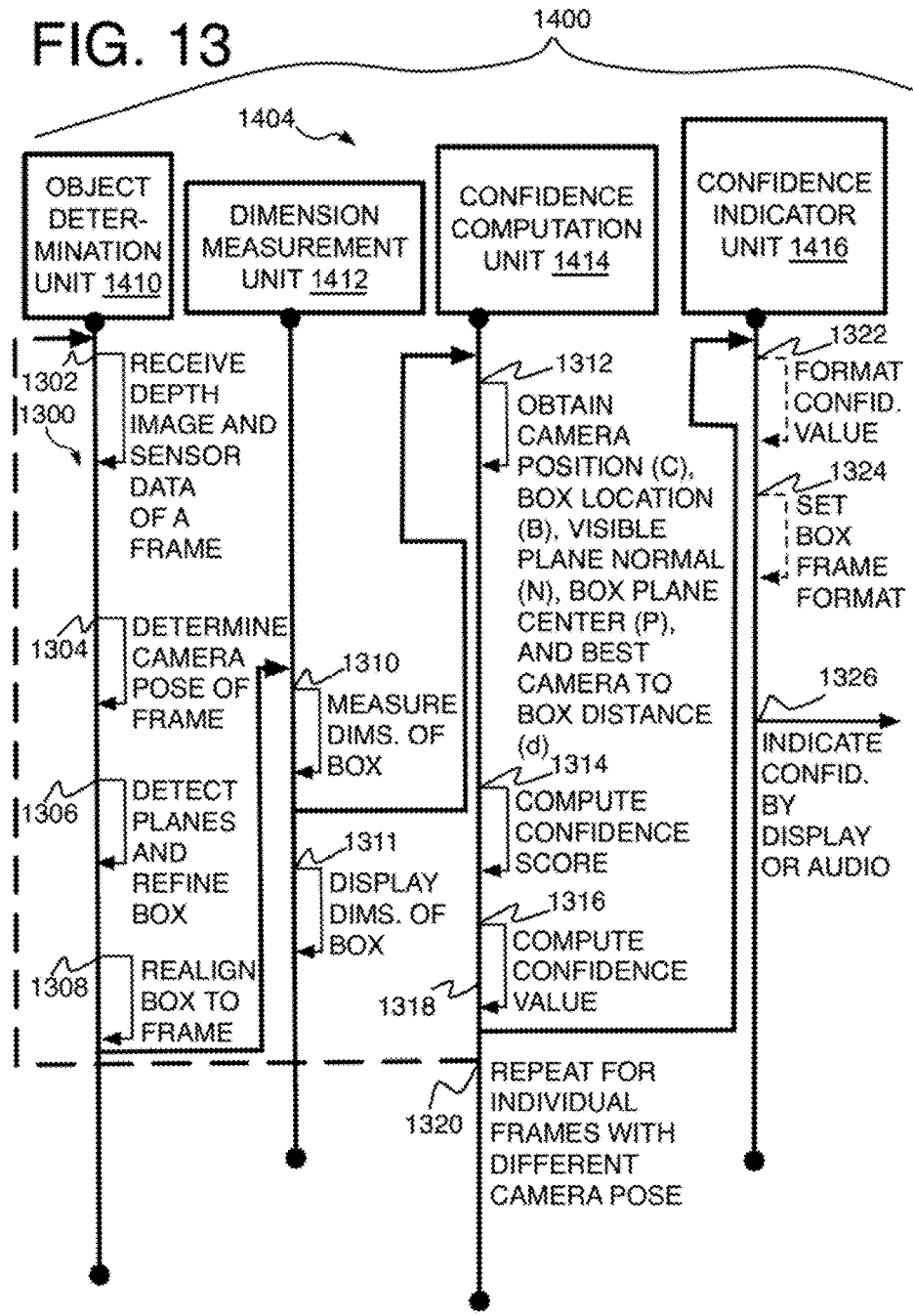
FIG. 13 is a diagram of the method of automatic object dimension measurement with confidence indication, by using image processing, and in operation according to the implementations described herein.

Referring to FIG. 13, process 1300 illustrates the operation of a sample image processing system 1400 that performs automatic object dimension measurement including the use of confidence values and confidence indicators in accordance with at least some implementations of the present disclosure. In more detail, in the illustrated form, process 1300 may include one or more operations, functions or actions as illustrated by one or more of actions 1302 to 1326 numbered evenly. By way of non-limiting example, process 1300 will be described herein with reference to FIG. 14. Specifically, system 1400 includes logic units or modules 1404. The logic modules 1404 may include an object determination unit 1410, dimension measurement unit 1412, confidence computation unit 1414, and a confidence indicator unit 1416. The operation of the system may proceed as follows. It will be understood that while boxes are mentioned here, any six sided object or any other object with multiple planar sides may be measured as described above.

Process 1300 may include "receive depth image and sensor data of a frame" 1302, and as described above with processes 300 and 400, where the raw image data has already been pre-processed, and the content of the image analyzed to provide 3D coordinates for each of the pixel points to form a depth image. It will be understood that when the images are frames in a video sequence for any of the processes mentioned herein that the process may apply to each depth image formed for each frame or other time period, and when multiple cameras are used, the depth image may be associated with, or representing, a three-dimensional space formed from multiple images of the same scene (which may or may not capture the scene at the same time instance). The 3D space very well may be in the form of a voxel grid by the examples provided herein. The buffer holding the raw images may be considered part of the exchange buffer described above.

This operation also may include receiving sensor data, whether from an accelerometer, gyroscope, and so forth, that indicates whether the camera or imaging device is right-side up or some other orientation so that horizontal and vertical directions can be determined in the captured images.

Process 1300 may include "determine camera pose of frame" 1304, and this may be performed in a number of different ways. By one form, this may be performed by matching a point cloud formed from the current image or current depth image, and matching it to the voxel grid, and then determining the camera pose by determining the orientation of the camera relative to the voxel grid. Other details are provided above. The camera pose then may be placed in a frame buffer that may be considered a part of the exchange buffer.

This operation also may include or may be performed parallel to an operation to accumulate depth images, which is an operation to include the matched point cloud in the voxel grid and revise the voxel grid. The result is an accumulated depth image for the current image being analyzed. This accumulated depth image also may be placed in an image or frame buffer that may be considered part of the exchange buffer.

Process 1300 may include "detect planes and refine box" 1306. This refers to the parallel plane and object detection and refinement process described above, and may include determining ROIs in an image that are likely to be planes based on past object poses stored in a memory buffer that is part of the exchange buffer. A plane detection process is performed that determines hypothesis planes by using the accumulated depth image data and only within the ROIs of the image. Then, votes are used to determine which plane hypotheses are the actual planes in the image. A plane and object refinement operation is then performed to match the planes to the raw image data, and then use the matched plane to determine an object or box pose. The new object pose is placed into the memory buffer where it is accessible for realignment as well as to determine ROIs for the next image being analyzed for planes. The details are provided above.

Process 1300 may include "realign box to frame" 1308. The latest object pose is obtained from the memory buffer. When there are multiple object poses in a single image, the object pose for the object being analyzed is obtained, and this may be obtained one object at a time, or all of the object poses of an image may be obtained at once by obtaining the image data from the memory buffer. Whatever object pose that is in the memory buffer is obtained without waiting for the parallel plane and object detection and refinement process to update the object pose in the memory buffer. Thus, the parallel process may be behind in its processing and may not be able to keep up with the realignment process image to image, but due to the relatively small amount of change that occurs from single image to single image, such change should not be significant and may not significantly matter since the object pose is moved to realign with the current frame anyway. The object pose is then realigned to the current image in the perspective of the current camera pose (or in other words, the camera coordinate system of the current image). Other details are provided above. Once the object has been realigned to the current image, the current image may be displayed and the object may be measured to display the dimensions of the object.

Thus, process 1300 may include "measure dimensions of box" 1310, and this may include measuring a pixel or sub-pixel measurement between what is deemed to be the corners or edges of the box or six-sided figure. The pixel-based measurement then may be converted to real-world dimensions as determined when constructing the accumulated 3D depth image or voxel grid.

Once the dimensions are determined, process 1300 may include "display dimensions of box" 1312, and this may include listing the dimensions by object displayed on the imaging device and in a separate listing area of the screen (as in device 700 (FIG. 7)), or the dimensions may be placed next to or on the object being measured on the image being displayed on the imaging device as in real-time or close to real-time. In this case, the dimensions may be placed near the side or edge of the object that the dimension is associated with as shown with image 300 (FIG. 3).

As to the generation of a confidence value, process 1300 may include "obtain camera position (C), box location (B), visible plane normal (N), box plane center (P), and best camera to box distance (d)" 1314. This is an example of the parameters that may be used to compute a confidence value, although other parameters may be considered as well. The details of each of these parameters is explained above.

Process 1300 may include "compute confidence score" 1316. The relevant parameters are placed in equation (3) recited above, and equation (3) factors the angle of the camera to the three visible planes of the object facing the camera, and the distance from the camera to the object. Process 1300 then may include "compute confidence value" 1318, and the confidence score computed from equation (3) and the appropriate parameters are placed into equation (4) to compute the confidence value. Equation (4) adds a factor to consider the location of the object within the field of view (FOV) of the camera (how close the object is to the center of the FOV). The result is a single probability value (such as from 0 to 1).

Process 1300 may include "repeat for individual frames with difference camera pose" 1320. Thus, the process is repeated at least each time the camera moves, but can be repeated for each image or some interval of images like every 10 images, and while the object measurement feature is activated either automatically or manually by a user. To repeat, the process loops back to operation 1302.

Process 1300 may include "format confidence values" 1322, and particularly, the confidence value may be converted into a more generic publically understood value for display such as a percentage (from 0% to 100%).

Optionally, process 1300 may include "set box frame format" 1324, or in other words, a wireframe of the box or object may be generated to highlight the edges of the object of at least show where the computed (or in other words, detected) edges of the box are positioned in the image being displayed. By one form, only the visible edges are displayed. By another form, the edges of the hidden sides of a six-sided object or box may be displayed as well, which could be in dashed line form to show that a particular side is a hidden side of the object or box. An example of the wireframe is wireframe 304 (FIG. 3).

While the confidence values may be placed on a separate dimension list and/or next to the lines on the wireframe, the wireframe can indicate the confidence value, or at least a range of confidence values that include a current computed confidence value. This may be accomplished by changing the color of the wireframe. By one possible example, the wireframe is red if the confidence value is less than about 30%, yellow if the confidence value is between about 30% to 80%, and green if the confidence value is above about 80%. Otherwise, the wireframe may be changed in other ways, such as line thickness where the thickest line occurs at 80-100%, or line type, where dashes or other patterns are changed depending on the thickness, such as solid for higher confidence values, and dashes that become shorter as the confidence value reduces. Another way to show such confidence value may be to increase the transparency of the wireframe as the confidence value lowers. By yet another form, a confidence bar may be displayed, where one end is 0% and another end is 100%, and a bar grows towards 100% as the confidence value increases. The color of the bar, or end of the bar, may change colors as well, from red, yellow, to green as mentioned with the wireframe. Many other variations or alternatives can be used.

Process 1300 may include "indicate confidence by display or audio" 1326. The confidence value then may be displayed by the examples provided above and over the rendering of the current image for example. The confidence value may be updated with each frame that is displayed, and also does not wait for the updating of the object pose in the object buffer or exchange buffer. By an alternative, when the imaging device has audio capability such as with a smartphone, the confidence value may be announced audibly if desired, by converting the confidence value to an audible signal.

Any one or more of the operations of FIGS. 8-10 and 12-13 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 14:
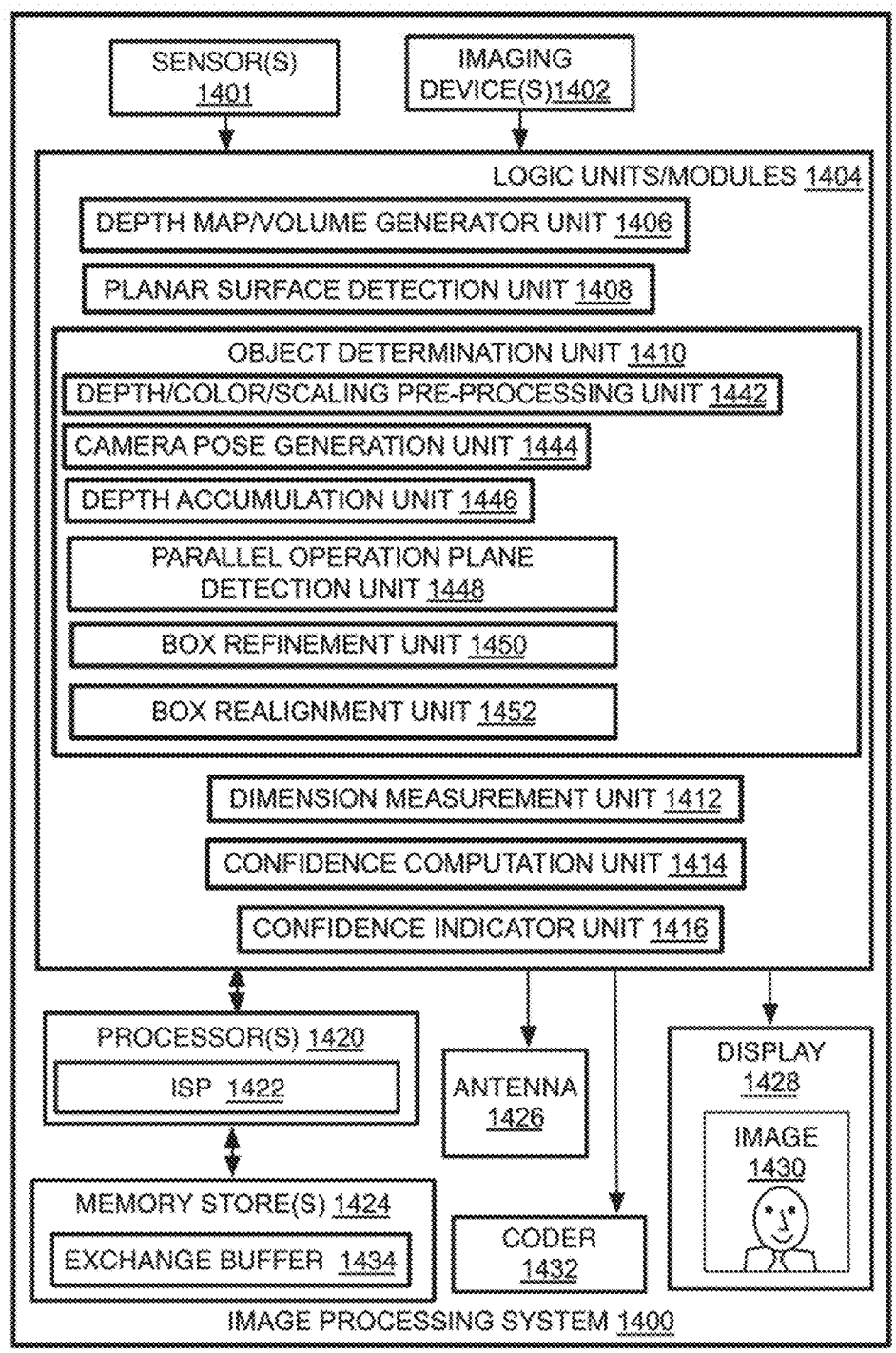
FIG. 14 is an illustrative diagram of an example system.

Referring to FIG. 14, an example image processing system 1400 is arranged in accordance with at least some implementations of the present disclosure. In various implementations, the example image processing system 1400 may have an imaging device 1402 to form or receive captured image data. This can be implemented in various ways. Thus, in one form, the image processing system 1400 may be one or more digital cameras or other image capture devices, and imaging device 1402, in this case, may be the camera hardware and camera sensor software, module, or component. In other examples, imaging processing system 1400 may have an imaging device 1402 that includes or may be one or more cameras, and logic modules 1404 may communicate remotely with, or otherwise may be communicatively coupled to, the imaging device 1402 for further processing of the image data.

Thus, image processing device 1400 may be a single camera on a multi-camera device such as a smartphone, tablet, laptop, or other mobile device. Otherwise, device 1400 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1402 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1402 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1402 may be provided with an eye tracking camera.

Device 1400 also may have one or more sensors 1401 which may include at least an accelerometer and gyroscope, but other sensors could be present as well, in order to determine the orientation of the camera relative to the ground. The sensors also may provide data to the logic units 1404.

In the illustrated example and most relevant here, the logic modules 1404 may include a depth map/volume generator unit 1406 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene). This may include generation and management of a voxel grid as well and as described above. The logic modules 1404 also may include a planar surface detection unit 1408 to detect the planar surfaces in the depth images, also as described above. The logic units 1404 also may include an object dimension unit 1410 that detects and refines objects, a dimension measurement unit 1412 that measures the objects, a confidence computation unit 1414 that computes a confidence value for the dimension of an object, and a confidence indicator unit 1416 that indicates the confidence value by display, audio, or other indicator. The object determination unit 1410 may have a depth/color/scaling pre-processing unit 1442 that may perform pre-processing on the image data sufficient to perform the object display, detection, and refinement, and the object measurement as described above. A camera pose generation unit 1444 is provided as well as a depth accumulation unit 1446, parallel operation plane detection unit 1448, box refinement unit 1450, and box realignment unit 1452. The operation of these units is explained in the methods described above, where the name of the operation corresponds to the name of the logic unit in many of the operations. In these examples, the logic modules 1404 may be considered to be separate from the imaging device or may be considered to be part of the imaging device, or one of the imaging devices when multiple imaging devices are provided.

The image processing system 1400 may have one or more processors 1420 which may include a dedicated image signal processor (ISP) 1422 such as the Intel Atom, memory stores 1424 and/or one or more GPUs, one or more displays 1428 to provide images 1430, a coder 1432, and antenna 1426. In one example implementation, the image processing system 1400 may have the display 1428, at least one processor 1420 communicatively coupled to the display, and at least one memory 1424 communicatively coupled to the processor. The memory store(s) 1424 may include the exchange buffer 1434 such as exchange buffer 1102 and including the object buffer and other buffers mentioned above. Such memory may be in the form of RAM, such as DRAM or other types of RAM, but may also include any other sufficient memory for the purposes provided herein, and whether non-volatile memory or cache, and whether or not on-board memory, such as on an SoC, or external memory (whether external to an SoC or external to the computing device itself).

The coder 1432, which may be an encoder, decoder, or both, also may be provided. As an encoder 1432 and antenna 1434 may be provided to compress the modified image date for transmission to other devices that may display or store the image. It will be understood that the image processing system 1400 also may include a decoder (or encoder 1432 may include a decoder) to receive and decode image data for processing by the system 1400. Otherwise, the processed image 1430 may be displayed on display 1428 or stored in memory 1424. As illustrated, any of these components may be capable of communication with one another and/or communication with portions of logic modules 1404 and/or imaging device 1402. Thus, processors 1420 may be communicatively coupled to both the image device 1402 and the logic modules 1404 for operating those components. By one approach, although image processing system 1400, as shown in FIG. 14, may include one particular set of blocks or actions associated with particular components or modules, these blocks or actions may be associated with different components or modules than the particular component or module illustrated here.

Figure 15:
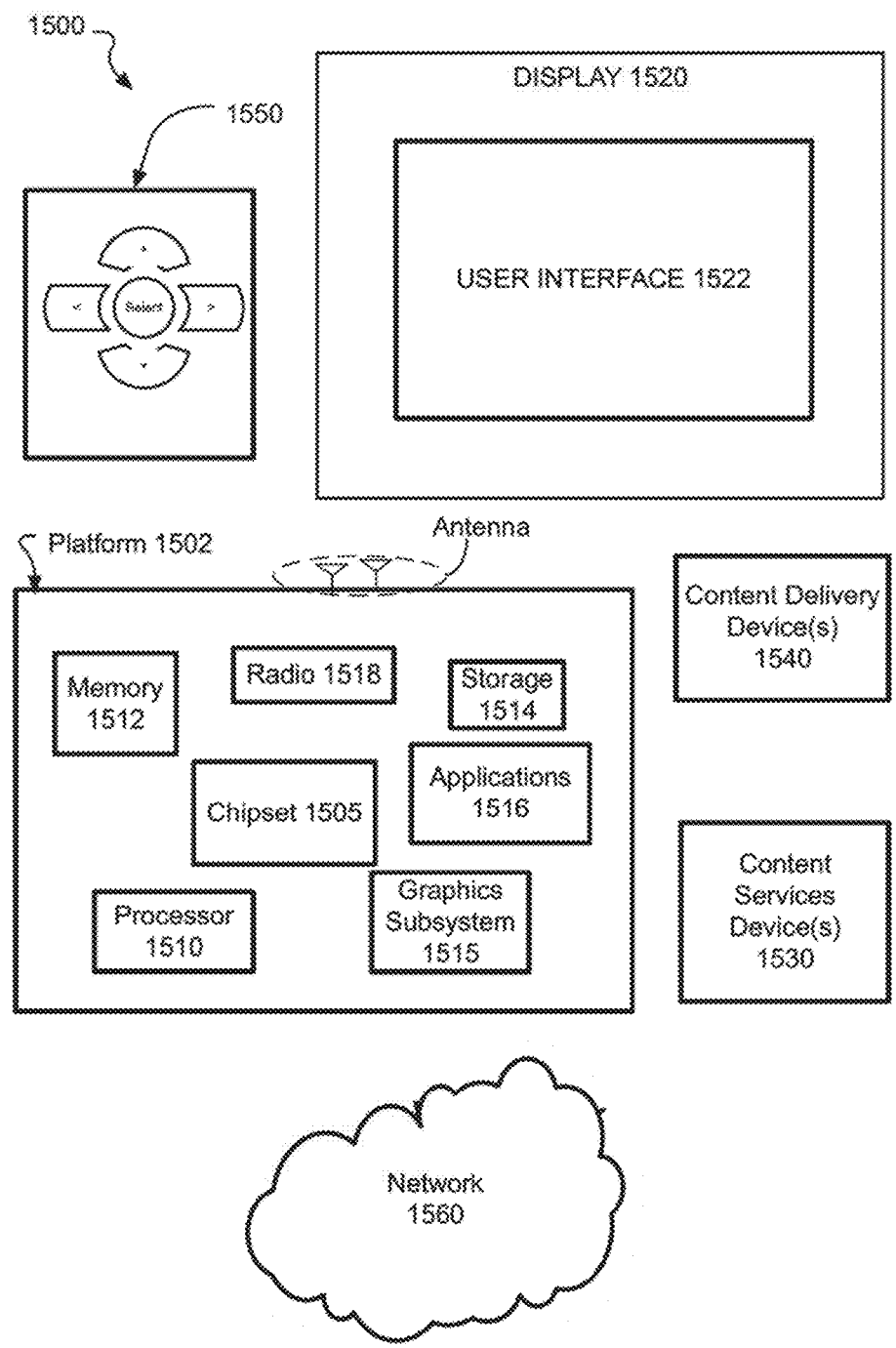
FIG. 15 is an illustrative diagram of another example system.

Referring to FIG. 15, an example system 1500 in accordance with the present disclosure operates one or more aspects of the image processing system described herein. It will be understood from the nature of the system components described below that such components may be associated with, or used to operate, certain part or parts of the image processing system 1400 described above. In various implementations, system 1500 may be a media system although system 1500 is not limited to this context. For example, system 1500 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, Display Port, wireless HDMI, and/or wireless HD compliant techniques. Graphics subsystem 1515 may be integrated into processor 1510 or chipset 1505. In some implementations, graphics subsystem 1515 may be a stand-alone card communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of unidirectionally or bidirectionally communicating content between content providers and platform 1502 and/display 1520, via network 1560 or directly. It will be appreciated that the content may be communicated unidirectionally and/or bidirectionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In implementations, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In implementations, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various implementations, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various implementations, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 15.

Figure 16:
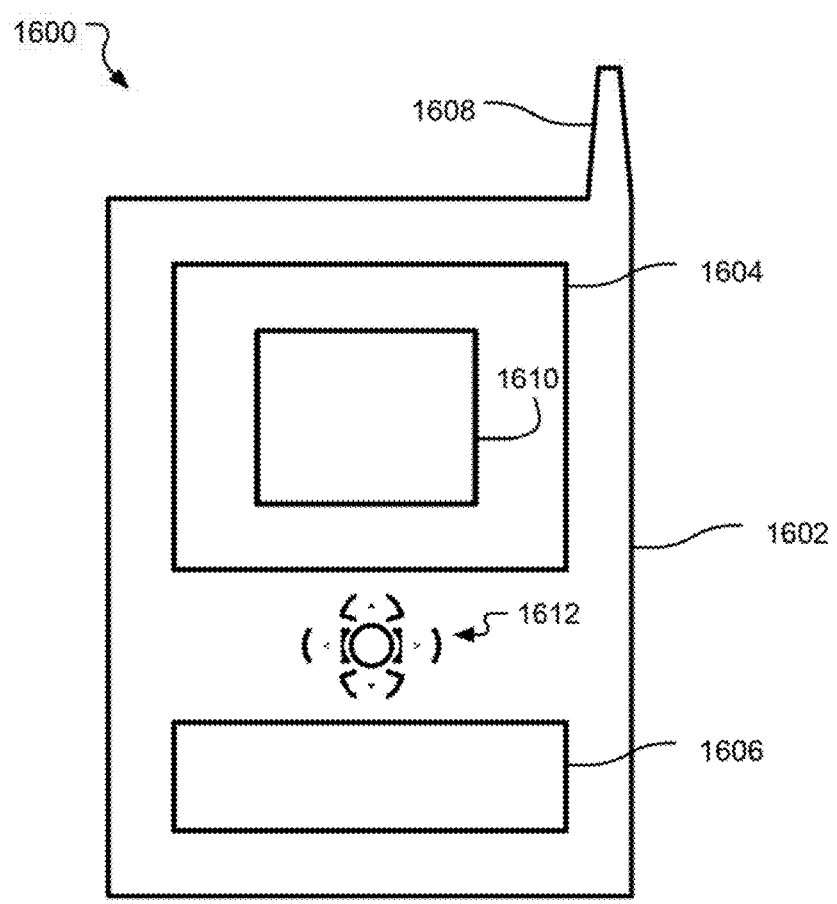
FIG. 16 illustrates another example device, all arranged in accordance with at least some implementations of the present disclosure.

Referring to FIG. 16, a small form factor device 1600 is one example of the varying physical styles or form factors in which system 1400 and/or 1500 may be embodied. By this approach, device 1600 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 16, device 1600 may include a housing 1602, a display 1604 including a screen 1610, an input/output (I/O) device 1606, and an antenna 1608. Device 1600 also may include navigation features 1612. Display 1604 may include any suitable display unit for displaying information appropriate for a mobile computing device. I/O device 1606 may include any suitable I/O device for entering information into a mobile computing device. Examples for I/O device 1606 may include an alphanumeric keyboard, a numeric keypad, a touch pad, input keys, buttons, switches, rocker switches, microphones, speakers, voice recognition device and software, and so forth. Information also may be entered into device 1600 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of automatic object dimension measurement by using image processing, comprises obtaining depth image data of an object to be measured in a scene captured by a sequence of images comprising a current image; determining the camera pose used to capture at least the current image; accumulating image depth data as images from the sequence are obtained and in a global 3D coordinate system of the current image; obtaining an object pose comprising a position, size, and orientation of the object from an object memory; realigning the object pose to a camera coordinate system of the current image; and independently detecting and refining the object pose to update the object memory wherein independently refers to the realigning being performed by obtaining an existing object pose from the object memory without waiting for the updating of the object pose in the object memory.

By another implementation, this method may include that the detecting and refining comprises detecting planes in the scene and that are likely to form the object; the method determining the camera pose used to capture the scene to be used to refine the position of detected planes forming a side of the object; searching for planes only in one or more regions-of-interest (ROI(s)) on the image that is likely to form the object and that is less than the entire image; wherein the ROIs are determined by forming a binary map to separate objects from non-objects in the scene, and depending, at least in part, of consideration of at least one of: previously determined object location data from one or more other images, object edge data, object surface texture, and background identification data. The method also may include wherein detecting comprises detecting planes from the accumulated depth image data and wherein refining comprises positioning found planes in raw image data of the current image and fitting the planes to: at least one existing object in the object memory, new objects not in the object memory, or both.

The method also comprises wherein refining comprises determining a collective score of multiple planes to determine whether those planes form the object, wherein the score depends, at least in part, on the plane normal direction, plane size, plane distance to the camera, or any combination of these, wherein the global three-dimensional coordinate system is formed of a voxel grid. The method comprising updating the object memory when the object pose has been refined using detected planes, and obtaining the object pose from the object memory to perform the realigning regardless of whether or not the object memory has been updated since the previous time the realigning was performed for the same object; and performing a data exchange comprising placing an updated object pose in the object memory and obtaining accumulated depth image data and a camera pose of the current frame to perform the detecting and refining while obtaining an object pose from the object memory to perform the realignment; wherein an object pose at the object memory is not updated until the substantially same object pose is detected a minimum number of times; wherein a previous object of a previous image object is considered the substantially same as a subsequent object of one or more subsequent images during detecting and refining when the object poses of the previous and subsequent objects are within a threshold distance of each other. The method comprising computing a confidence value indicating the confidence in dimension measurements of the object displayed to a user, and being based, at least in part, on the camera position, and the angle of the camera to planes forming the object.

By a further implementation, a computer-implemented system of automatic object dimension measurement by using image processing, comprising: at least one display; at least one memory at least one processor communicatively coupled to the display and the memory; an object determination unit operated by the at least one processor and to operate by: obtaining depth image data of an object to be measured in a scene captured in a sequence of images comprising a current image; determining the camera pose used to capture at least the current image; accumulating image depth data as images from the sequence are obtained and in a global 3D coordinate system of the current image; obtaining an object pose comprising a position, size, and orientation of the object from an object memory; realigning the object pose to a camera coordinate system of the current image; and independently detecting and refining the object pose to update the object memory wherein independently refers to the realigning being performed by obtaining an existing object pose from the object memory without waiting for the updating of the object pose in the object memory.

The system may also comprise a camera capturing images of a scene having the object; an object dimension unit computing dimensions of the object; and a confidence value unit computing confidence values that indicate a confidence in the accuracy of the dimensions and that changes as a user moves the camera; wherein the confidence value is displayed on the display in a position that indicates the confidence value is associated with one or more object dimensions displayed to the user; wherein the confidence value is a number value that is displayed to a user on at least one of: a listing of dimensions and confidence values separate from a display of the object, near or on the object being measured and on the display, and a side of a wireframe placed on the edges of the object and with one of the dimensions.

The system also may include that wherein the confidence value is in the form of a wireframe formed of connected lines placed around the object and that changes color, line thickness, or line-type depending on the confidence value; wherein the confidence value is in the form of audio; and wherein the confidence value is based, at least in part, on at least one of: the angle of at least one plane of the object relative to the optical axis of the camera, the distance between the camera and the object, the object positioning in a field of view of the camera, and a combination of any of these; wherein the confidence value is based, at least in part, on the camera position, and the angle of the camera to planes forming the object; and wherein the confidence value is based, at least in part, on a camera position, object center, a normal direction of a visible object plane forming the object, a center of a visible object plane forming the object, and a predetermined best distance from camera to object.

As another implementation, a computer-readable article having stored thereon instructions that when executed cause a computing device to operate by obtaining depth image data of an object to be measured in a scene captured in a sequence of images comprising a current image; determining the camera pose used to capture at least the current image; accumulating image depth data as images from the sequence are obtained and in a global 3D coordinate system of the current image; obtaining an object pose comprising a position, size, and orientation of the object obtained from an object memory; realigning the object pose to a camera coordinate system of the current image; and independently detecting and refining the object pose to update the object memory wherein independently refers to the realigning being performed by obtaining an existing object pose from the object memory without waiting for the updating of the object pose in the object memory.

As another option, the instructions execute the computing device and include that wherein detecting and refining comprises: searching for planes only in one or more regions-of-interest (ROI(s)) on an image that is likely to form the object and that is less than the entire image; and fitting the planes to the object depending on a score corresponding to a group of planes and to form an object pose to place in the object memory.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic object dimension measurement by using image processing, comprising:
    obtaining depth image data of an object to be measured in a scene captured by a sequence of images comprising a current image;
    determining the camera pose used to capture at least the current image;
    accumulating image depth data as images from the sequence are obtained and in a global 3D coordinate system of the current image;
    obtaining an object pose comprising a position, size, and orientation of the object from an object memory;
    realigning the object pose to a camera coordinate system of the current image; and
    independently detecting and refining the object pose to update the object memory wherein independently refers to the realigning being performed by obtaining an existing object pose from the object memory without waiting for the updating of the object pose in the object memory.

2. The method of claim 1 wherein detecting and refining comprises detecting planes in the scene and that are likely to form the object.

3. The method of claim 2 comprising determining the camera pose used to capture the scene to be used to refine the position of detected planes forming a side of the object.

4. The method of claim 2 comprising searching for planes only in one or more regions-of-interest (ROI(s)) on the image that is likely to form the object and that is less than the entire image.

5. The method of claim 4 wherein the ROIs are determined by forming a binary map to separate objects from non-objects in the scene, and depending, at least in part, of consideration of at least one of:
    previously determined object location data from one or more other images,
    object edge data,
    object surface texture, and
    background identification data.

6. The method of claim 2 wherein detecting comprises detecting planes from the accumulated depth image data and wherein refining comprises positioning found planes in raw image data of the current image and fitting the planes to:
    at least one existing object in the object memory,
    new objects not in the object memory,
    or both.

7. The method of claim 2 comprising wherein refining comprises determining a collective score of multiple planes to determine whether those planes form the object.

8. The method of claim 7 wherein the score depends, at least in part, on the plane normal direction, plane size, plane distance to the camera, or any combination of these.

9. The method of claim 1 wherein the global three-dimensional coordinate system is formed of a voxel grid.

10. The method of claim 1 comprising updating the object memory when the object pose has been refined using detected planes, and obtaining the object pose from the object memory to perform the realigning regardless of whether or not the object memory has been updated since the previous time the realigning was performed for the same object.

11. The method of claim 1 comprising performing a data exchange comprising placing an updated object pose in the object memory and obtaining accumulated depth image data and a camera pose of the current frame to perform the detecting and refining while obtaining an object pose from the object memory to perform the realignment.

12. The method of claim 1 wherein an object pose at the object memory is not updated until the substantially same object pose is detected a minimum number of times.

13. The method of claim 1 wherein a previous object of a previous image is considered the substantially same as a subsequent object of one or more subsequent images during detecting and refining when the object poses of the previous and subsequent objects are within a threshold distance of each other.

14. The method of claim 1 comprising computing a confidence value indicating the confidence in dimension measurements of the object displayed to a user, and being based, at least in part, on the camera position, and the angle of the camera to planes forming the object.

15. A computer-implemented system of automatic object dimension measurement by using image processing, comprising:
    at least one display;
    at least one memory
    at least one processor communicatively coupled to the display and the memory;
    an object determination unit operated by the at least one processor and to operate by:
        obtaining depth image data of an object to be measured in a scene captured in a sequence of images comprising a current image;
        determining the camera pose used to capture at least the current image;
        accumulating image depth data as images from the sequence are obtained and in a global 3D coordinate system of the current image;
        obtaining an object pose comprising a position, size, and orientation of the object from an object memory;
        realigning the object pose to a camera coordinate system of the current image; and independently detecting and refining the object pose to update the object memory wherein independently refers to the realigning being performed by obtaining an existing object pose from the object memory without waiting for the updating of the object pose in the object memory.

16. The system of claim 15 comprising:
a camera capturing images of a scene having the object;
an object dimension unit computing dimensions of the object; and
a confidence value unit computing confidence values that indicate a confidence in the accuracy of the dimensions and that changes as a user moves the camera.

17. The method of claim 16 wherein the confidence value is displayed on the display in a position that indicates the confidence value is associated with one or more object dimensions displayed to the user.

18. The method of claim 16 wherein the confidence value is a number value that is displayed to a user on at least one of:
a listing of dimensions and confidence values separate from a display of the object,
near or on the object being measured and on the display, and
a side of a wireframe placed on the edges of the object and with one of the dimensions.

19. The system of claim 16 wherein the confidence value is in the form of a wireframe formed of connected lines placed around the object and that changes color, line thickness, or line-type depending on the confidence value.

20. The system of claim 16 wherein the confidence value is in the form of audio.

21. The system of claim 16 wherein the confidence value is based, at least in part, on at least one of:
the angle of at least one plane of the object relative to the optical axis of the camera,
the distance between the camera and the object,
the object positioning in a field of view of the camera, and
a combination of any of these.

22. The system of claim 16 wherein the confidence value is based, at least in part, on a camera position, and the angle of the camera to planes forming the object.

23. The system of claim 16 wherein the confidence value is based, at least in part, on a camera position, object center, a normal direction of a visible object plane forming the object, a center of a visible object plane forming the object, and a predetermined best distance from camera to object.

24. A non-transitory computer-readable medium having stored thereon instructions that when executed cause a computing device to operate by:
obtaining depth image data of an object to be measured in a scene captured in a sequence of images comprising a current image;
determining the camera pose used to capture at least the current image;
accumulating image depth data as images from the sequence are obtained and in a global 3D coordinate system of the current image;
obtaining an object pose comprising a position, size, and orientation of the object obtained from an object memory;
realigning the object pose to a camera coordinate system of the current image; and
independently detecting and refining the object pose to update the object memory wherein independently refers to the realigning being performed by obtaining an existing object pose from the object memory without waiting for the updating of the object pose in the object memory.

25. The non-transitory computer-readable medium of claim 24 wherein detecting and refining comprises:
searching for planes only in one or more regions-of-interest (ROI(s)) on an image that is likely to form the object and that is less than the entire image; and
fitting the planes to the object depending on a score corresponding to a group of planes and to form an object pose to place in the object memory.

* * * * *